US012804159B2

(12) United States Patent
Vishwanath et al.

(10) Patent No.: US 12,804,159 B2
(45) Date of Patent: Nov. 17, 2026

(54) METHOD, APPARATUS, AND MEDIUM FOR VIDEO PROCESSING

(71) Applicant: Bytedance Inc., Los Angeles, CA (US)

(72) Inventors: Bharath Vishwanath, Los Angeles, CA (US); Kai Zhang, Los Angeles, CA (US); Li Zhang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 19/009,847

(22) Filed: Jan. 3, 2025

(65) Prior Publication Data

US 2025/0142081 A1 May 1, 2025

Related U.S. Application Data

(63) Continuation of application No. PCT/US2023/069638, filed on Jul. 5, 2023.

(60) Provisional application No. 63/358,463, filed on Jul. 5, 2022.

(51) Int. Cl.

| | |
|---|---|
| ***H04N 19/139*** | (2014.01) |
| ***H04N 19/103*** | (2014.01) |
| ***H04N 19/176*** | (2014.01) |
| ***H04N 19/184*** | (2014.01) |
| ***H04N 19/70*** | (2014.01) |

(52) U.S. Cl.
CPC ......... *H04N 19/139* (2014.11); *H04N 19/103* (2014.11); *H04N 19/176* (2014.11); *H04N 19/184* (2014.11); *H04N 19/70* (2014.11)

(58) Field of Classification Search
CPC .. H04N 19/139; H04N 19/103; H04N 19/176; H04N 19/184; H04N 19/70; H04N 19/186; H04N 19/82; H04N 19/117
See application file for complete search history.

(56) References Cited

U.S. PATENT DOCUMENTS

2020/0260119 A1* 8/2020 Esenlik .................. H04N 19/70
2020/0288158 A1* 9/2020 Rusanovskyy ...... H04N 19/176
2022/0124343 A1 4/2022 Filippov et al.

OTHER PUBLICATIONS

International Search Report for PCT/US2023/69638, mailed on Nov. 13, 2023, 3 pages.

* cited by examiner

*Primary Examiner* — Nasim N Nirjhar
(74) *Attorney, Agent, or Firm* — Astute IP Law Group

(57) ABSTRACT

Embodiments of the present disclosure provide a solution for video processing. A method for video processing is proposed. The method comprises: obtaining, for a conversion between a current video block of a video and a bitstream of the video, values for a set of adjusting parameters associated with values for a set of model parameters of a local illumination compensation (LIC) model for coding the current video block; updating the values for the set of model parameters based on the values for the set of adjusting parameters; and performing the conversion based on the updated values for the set of model parameters.

20 Claims, 29 Drawing Sheets

1300

1702

1900

2000

2100

| Merge index | L0 MV | L1 MV |
|---|---|---|
| 0 | x | |
| 1 | | x |
| 2 | x | |
| 3 | | x |
| 4 | x | |

2200

2300

METHOD, APPARATUS, AND MEDIUM FOR VIDEO PROCESSING

CROSS REFERENCE TO RELATED APPLICATIONS

This application is a continuation of International Application No. PCT/US2023/069638, filed on Jul. 5, 2023, which claims the benefit of U.S. Provisional Application No. 63/358,463, filed on Jul. 5, 2022. The entire contents of these applications are hereby incorporated by reference in their entireties.

FIELDS

Embodiments of the present disclosure relates generally to video processing techniques, and more particularly, to parameter refinement for illumination compensation in video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding quality of video coding techniques is generally expected to be further improved.

SUMMARY

Embodiments of the present disclosure provide a solution for video processing.

In a first aspect, a method for video processing is proposed. The method comprises: obtaining, for a conversion between a current video block of a video and a bitstream of the video, values for a set of adjusting parameters associated with values for a set of model parameters of a local illumination compensation (LIC) model for coding the current video block; updating the values for the set of model parameters based on the values for the set of adjusting parameters; and performing the conversion based on the updated values for the set of model parameters.

According to the method in accordance with the first aspect of the present disclosure, the values for at least one model parameter of an LIC model is updated with one or more adjusting parameters. Compared with the conventional solution, the proposed method can refine the model parameter for illumination compensation, so as to obtain model parameter optimal for the current video. Thereby, the coding quality can be improved.

In a second aspect, an apparatus for video processing is proposed. The apparatus comprises a processor and a non-transitory memory with instructions thereon. The instructions upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, another non-transitory computer-readable recording medium is proposed. The non-transitory computer-readable recording medium stores a bitstream of a video which is generated by a method performed by an apparatus for video processing. The method comprises: obtaining values for a set of adjusting parameters associated with values for a set of model parameters of an LIC model for coding a current video block of the video; updating the values for the set of model parameters based on the values for the set of adjusting parameters; and generating the bitstream based on the updated values for the set of model parameters.

In a fifth aspect, a method for storing a bitstream of a video is proposed. The method comprises: obtaining values for a set of adjusting parameters associated with values for a set of model parameters of an LIC model for coding a current video block of the video; updating the values for the set of model parameters based on the values for the set of adjusting parameters; generating the bitstream based on the updated values for the set of model parameters; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
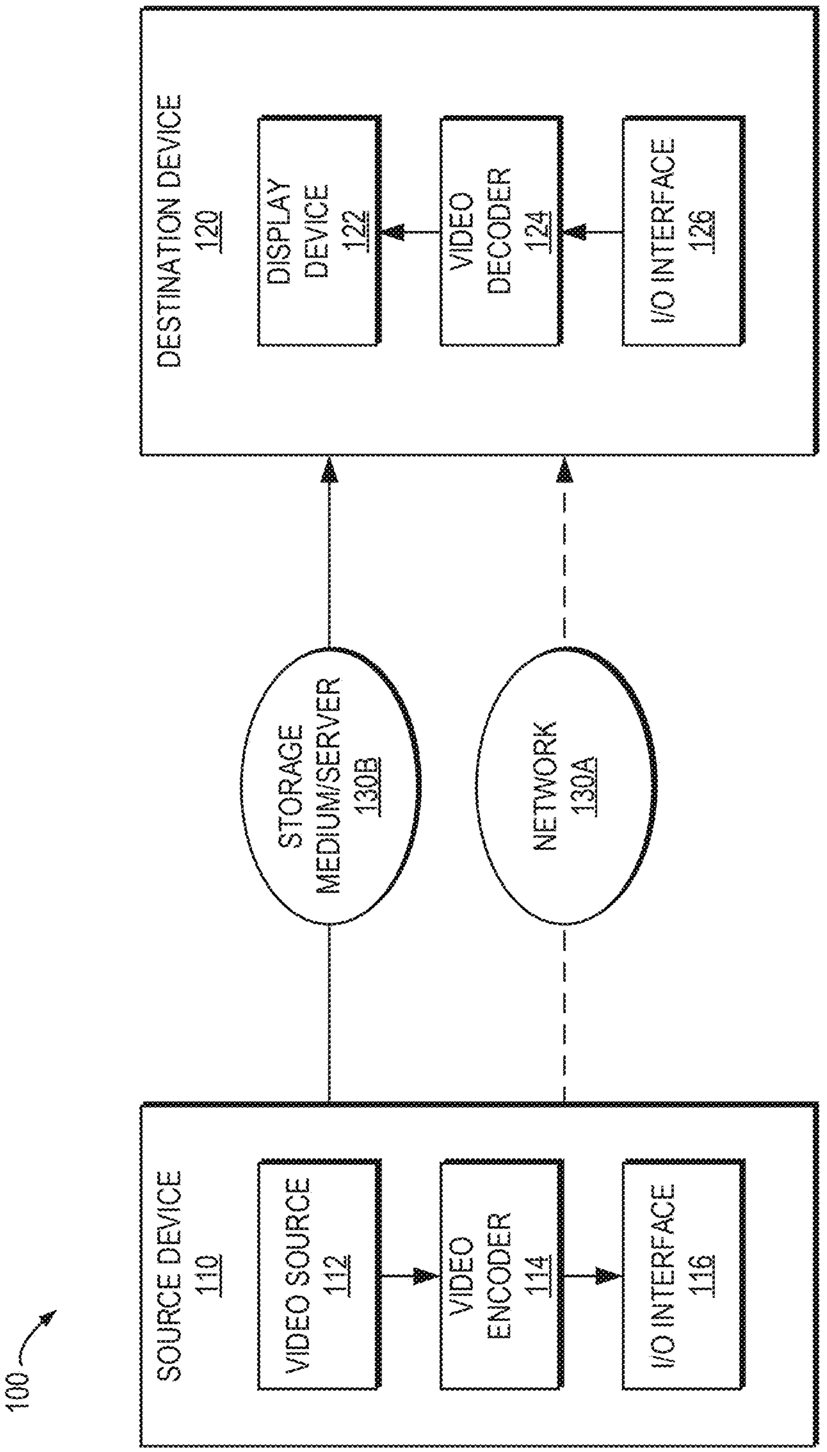
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
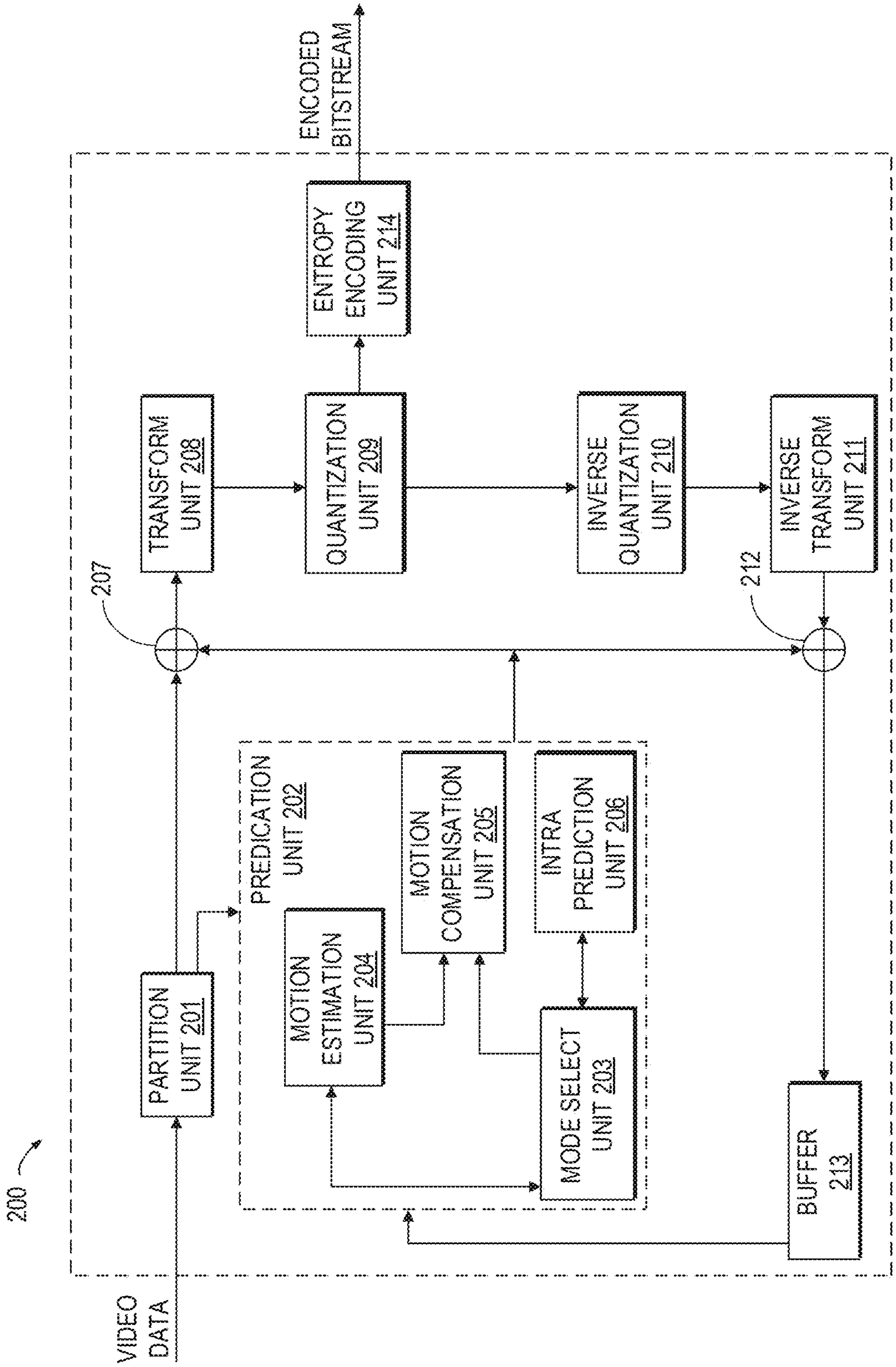
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a prediction unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the prediction unit 202 may include an intra block copy (IBC) unit. The IBC unit may perform prediction in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter prediction (CIIP) mode in which the prediction is based on an inter prediction signal and an intra prediction signal. The mode select unit 203 may also select a resolution for a motion vector (e.g., a sub-pixel or integer pixel precision) for the block in the case of inter-prediction.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

The intra prediction unit 206 may perform intra prediction on the current video block. When the intra prediction unit

206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the prediction unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
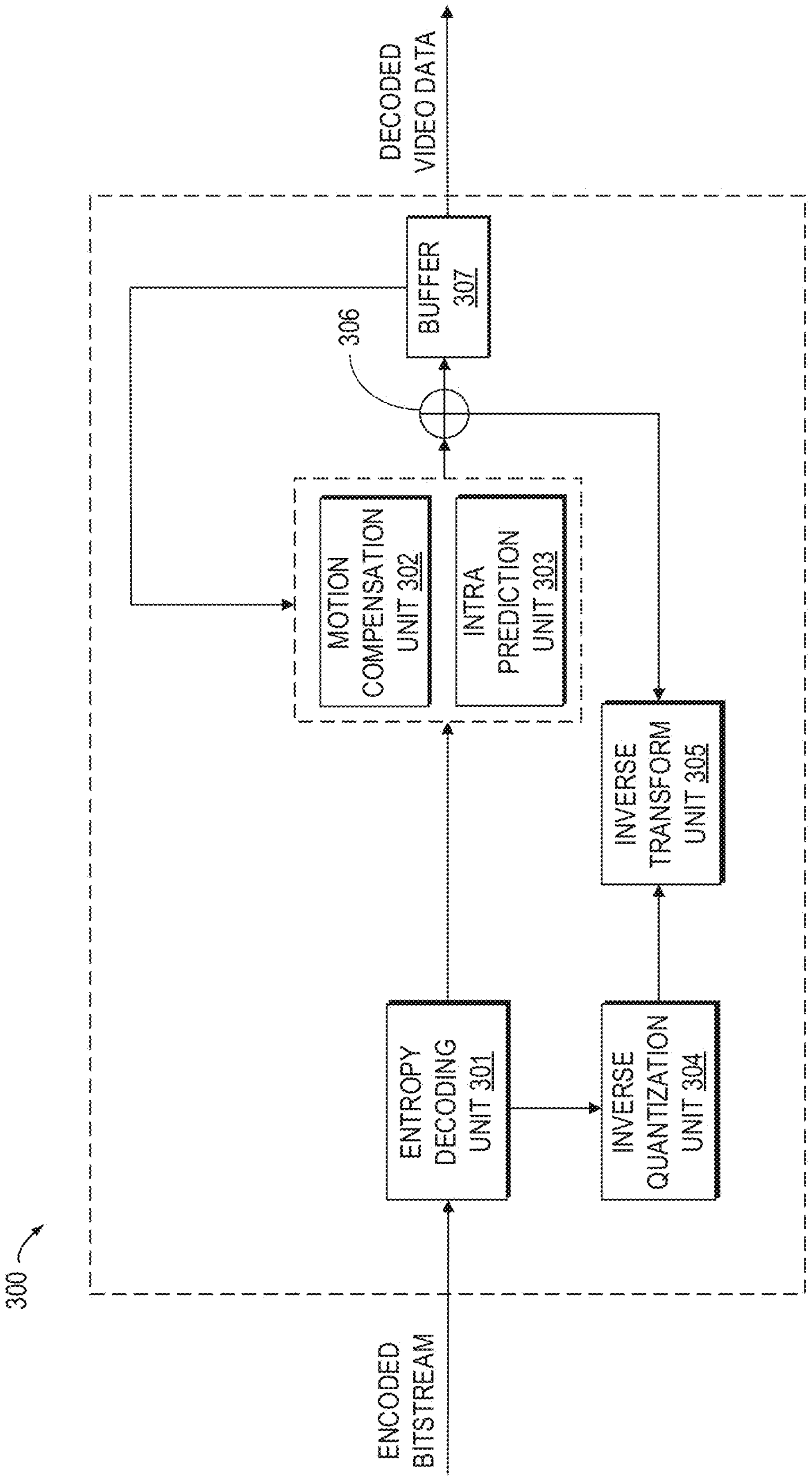
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra prediction and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1 BRIEF SUMMARY

This disclosure is related to video coding technologies. Specifically, it is related to inter prediction in video coding with special emphasis on sequences with illumination changes. The ideas may be applied individually or in various combinations, to any image/video coding standard or non-standard image/video codec, e.g., next-generation image/video coding standard.

2 INTRODUCTION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC (ITU-T and ISO/IEC, "High efficiency video coding", Rec. ITU-T H.265|ISO/IEC 23008-2 (in force edition)) standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting. ITU-T VCEG (Q6/16) and ISO/IEC MPEG (JTC 1/SC 29/WG 11) are studying the potential need for standardization of future video coding technology with a compression capability that significantly exceeds that of the current VVC standard. Such future standardization action could either take the form of additional extension(s) of VVC or an entirely new standard. The groups are working together to evaluate compression technology designs proposed by their experts in this area. The first Exploration Experiments (EE) were established in JVET meeting during 6-15 Jan. 2021 under the title Enhanced Compression Model (ECM).

2.1 Inter Prediction in VVC

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

- Extended merge prediction;
- High precision (1/16 pel) motion compensation and motion vector storage;
- Merge mode with MVD (MMVD);
- Symmetric MVD (SMVD) signalling;
- Affine motion compensated prediction;
- Subblock-based temporal motion vector prediction (SbTMVP);
- Adaptive motion vector resolution (AMVR);
- Bi-prediction with CU-level weight (BCW);
- Bi-directional optical flow (BDOF);
- Decoder side motion vector refinement (DMVR);
- Geometric partitioning mode (GPM);
- Combined inter and intra prediction (CIIP);
- Reference picture resampling.

The following text provides the details on those inter prediction methods specified in VVC.

2.1.1 Extended Merge Prediction

In VVC, the merge candidate list is constructed by including the following five types of candidates in order:

1) Spatial MVP from spatial neighbour CUs.
2) Temporal MVP from collocated CUs.
3) History-based MVP from an FIFO table.
4) Pairwise average MVP.
5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.1.1.1 Spatial Candidates Derivation

Figure 4:
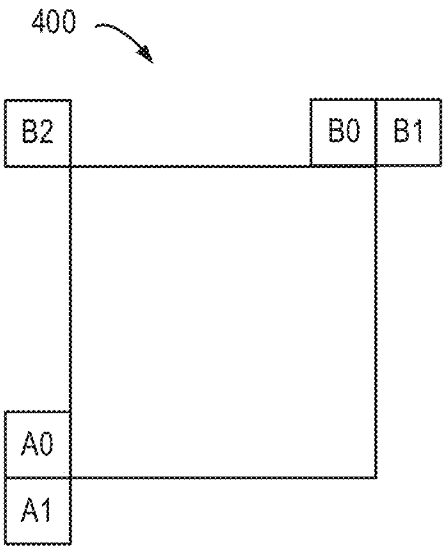
FIG. 4 illustrates positions of spatial merge candidate.
Figure 5:
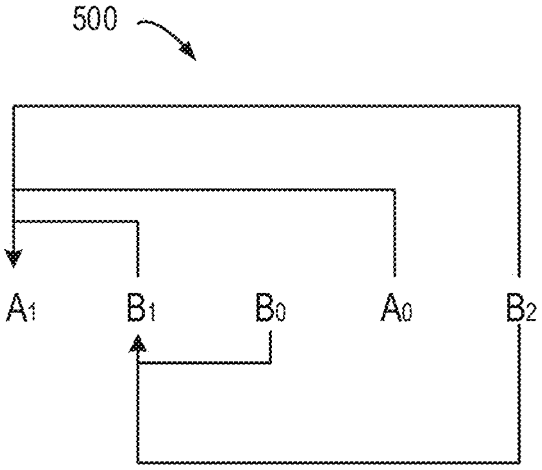
FIG. 5 illustrates candidate pairs considered for redundancy check of spatial merge candidates.

The derivation of spatial merge candidates in VVC is same to that in HEVC except the positions of first two merge candidates are swapped. A maximum of four merge candidates are selected among candidates located in the positions depicted in FIG. 4. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 5 are considered and a candidate is only added to the list if the corresponding candidate used for redundancy check has not the same motion information.

2.1.1.2 Temporal Candidates Derivation

Figure 6:
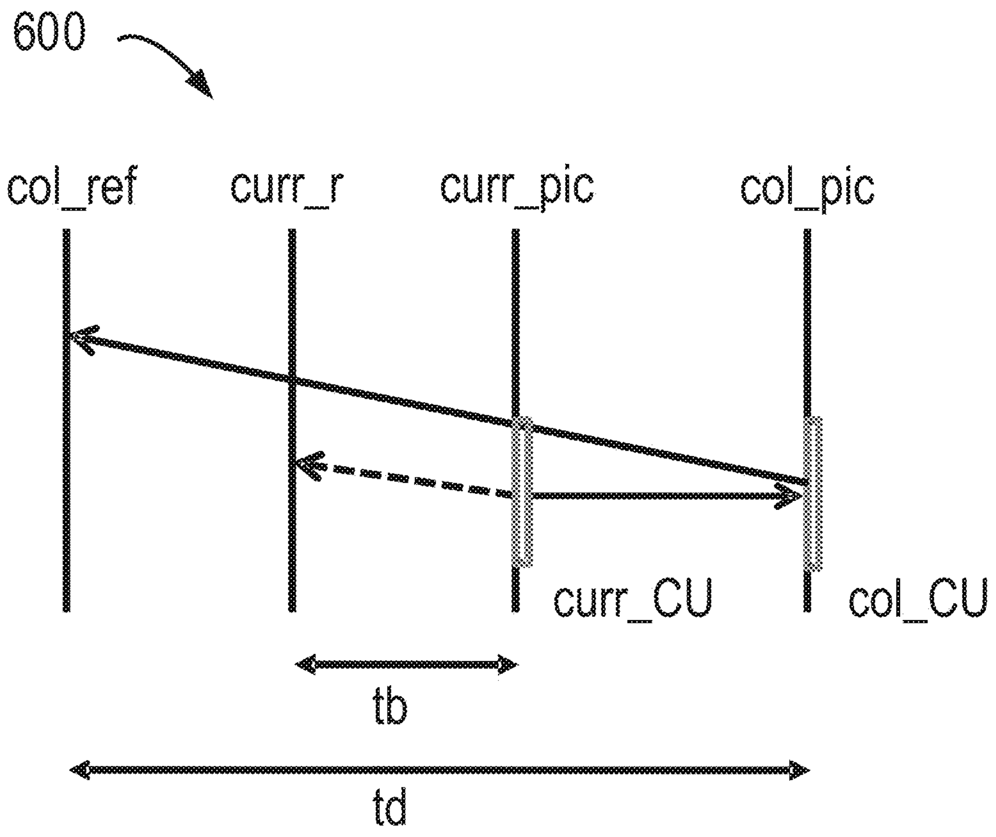
FIG. 6 illustrates illustration of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list and the reference index to be used for derivation of the co-located CU is explicitly signalled in the slice header. The scaled motion vector for temporal merge candidate is obtained as illustrated by the dotted line in FIG. 6, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 7:
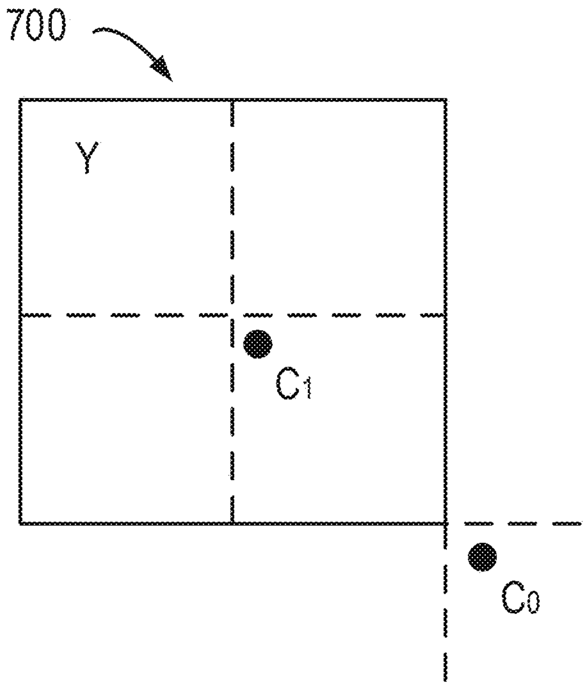
FIG. 7 illustrates candidate positions for temporal merge candidate, $C_0$ and $C_1$.

The position for the temporal candidate is selected between candidates $C_0$ and $C_1$, as depicted in FIG. 7. If CU at position $C_0$ is not available, is intra coded, or is outside of the current row of CTUs, position $C_1$ is used. Otherwise, position $C_0$ is used in the derivation of the temporal merge candidate.

2.1.1.3 History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 5 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. The last two entries in the table are redundancy checked to $A_1$ and $B_1$ spatial candidates, respectively.
2. Once the total number of available merge candidates reaches the maximally allowed merge candidates minus 1, the merge candidate list construction process from HMVP is terminated.

2.1.1.4 Pair-Wise Average Merge Candidates Derivation

Pairwise average candidates are generated by averaging predefined pairs of candidates in the existing merge candidate list, using the first two merge candidates. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors are averaged even when they point to different reference pictures, and its reference picture is set to the one of p0Cand; if only one motion vector is available, use the one directly; if no motion vector is available, keep this list invalid. Also, if the half-pel interpolation filter indices of p0Cand and p1Cand are different, it is set to 0.

When the merge list is not full after pair-wise average merge candidates are added, the zero MVPs are inserted in the end until the maximum merge candidate number is encountered.

2.1.1.5 Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

2.1.2 High Precision (1/16 Pel) Motion Compensation and Motion Vector Storage

VVC increases the MV precision to 1/16 luma sample, to improve the prediction efficiency of slow motion video. This higher motion accuracy is particularly helpful for video contents with locally varying and non-translational motion such as in case of affine mode. For fractional position samples generation of higher MV accuracy, HEVC's 8-tap luma interpolation filters and 4-tap chroma interpolation filters are extended to 16 phases for luma and 32 phases for chroma. This extended filter set is applied in MC process of inter coded CUs except the CUs in affine mode. For affine mode, a set of 6-tap luma interpolation filter with 16 phases is used for lower computational complexity as well as memory bandwidth saving.

In VVC, the highest precision of explicitly signalled motion vectors for non-affine CU is quarter-luma-sample. In some inter prediction modes such as the affine mode, motion vectors can be signalled at 1/16-luma-sample precision. In all inter coded CU with implicitly inferred MVs, the MVs are derived at 1/16-luma-sample precision and motion compensated prediction is performed at 1/16-sample-precision. In terms of internal motion field storage, all motion vectors are stored at 1/16-luma-sample precision.

For temporal motion field storage used by TMVP and SbTVMP, motion field compression is performed at 8×8 size granularity in contrast to the 16×16 size granularity in HEVC.

2.1.3 Merge Mode with MVD (MMVD))

In addition to merge mode, where the implicitly derived motion information is directly used for prediction samples generation of the current CU, the merge mode with motion vector differences (MMVD) is introduced in VVC. A MMVD flag is signalled right after sending a regular merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The mmvd candidate flag is signalled to specify which one is used between the first and second merge candidates.

Figure 8:
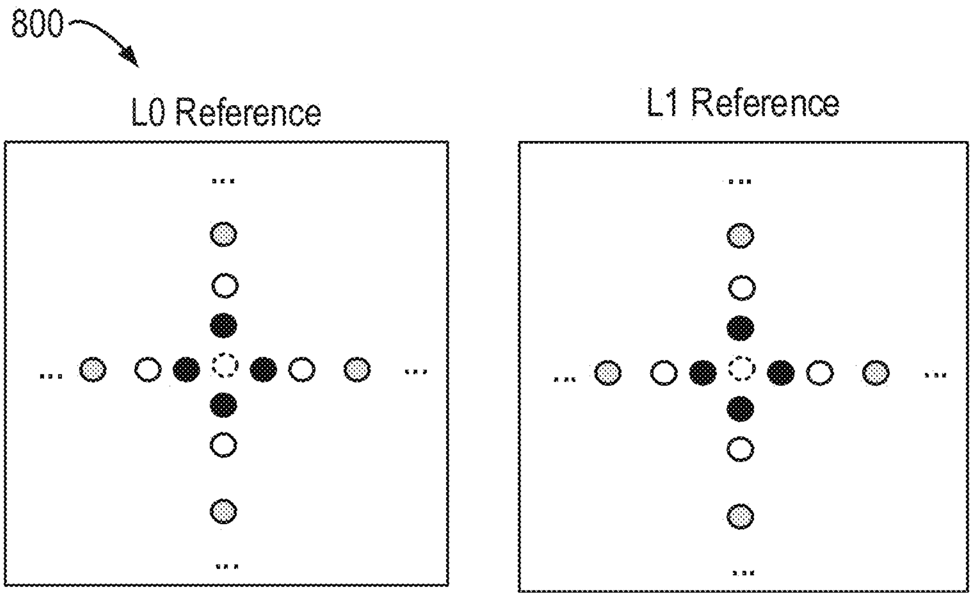
FIG. 8 illustrates MMVD Search Point.
Figure 9:
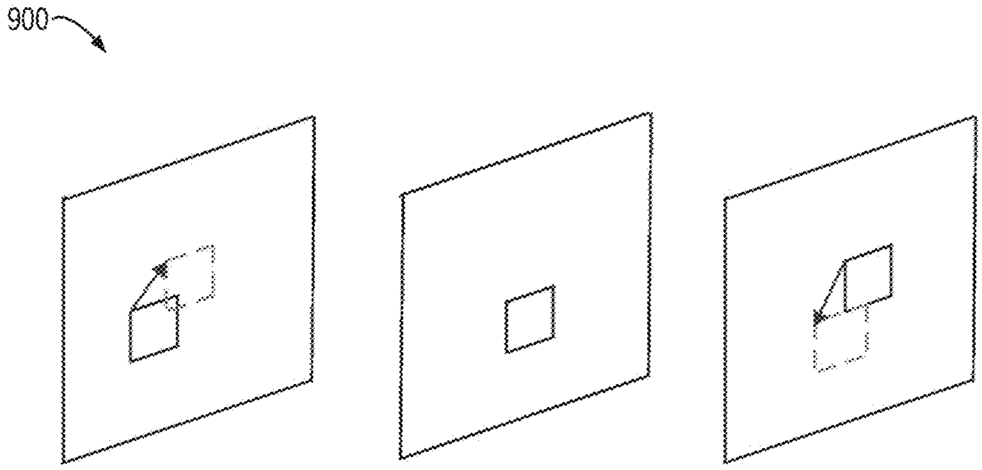
FIG. 9 illustrates illustration for symmetrical MVD mode.

Distance index specifies motion magnitude information and indicate the pre-defined offset from the starting point. As shown in FIG. 8, an offset is added to either horizontal component or vertical component of starting MV. The relation of distance index and pre-defined offset is specified in Table 3-6.

TABLE 3-6

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 3-7. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 3-7 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), and the difference of POC in list 0 is greater than the one in list 1, the sign in Table 3-7 specifies the sign of MV offset added to the list0 MV component of starting MV and the sign for the list1 MV has opposite value. Otherwise, if the difference of POC in list 1 is greater than list 0, the sign in Table 3-7 specifies the sign of MV offset added to the list1 MV component of starting MV and the sign for the list0 MV has opposite value.

The MVD is scaled according to the difference of POCs in each direction. If the differences of POCs in both lists are the same, no scaling is needed. Otherwise, if the difference of POC in list 0 is larger than the one of list 1, the MVD for list 1 is scaled, by defining the POC difference of L0 as td and POC difference of L1 as tb, described in FIG. 7. If the POC difference of L1 is greater than L0, the MVD for list 0 is scaled in the same way. If the starting MV is uni-predicted, the MVD is added to the available MV.

TABLE 3-7

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.1.4 Symmetric MVD Coding

In VVC, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1. At slice level, variables BiDirPredFlag, RefIdxSymL0 and RefIdxSymL1 are derived as follows:
   If mvd_11_zero_flag is 1, BiDirPredFlag is set equal to 0.
   Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.
2. At CU level, a symmetrical mode flag indicating whether symmetrical mode is used or not is explicitly signaled if the CU is bi-prediction coded and BiDirPredFlag is equal to 1.

When the symmetrical mode flag is true, only mvp_10_flag, mvp_11_flag and MVD0 are explicitly signaled. The reference indices for list-0 and list-1 are set equal to the pair of reference pictures, respectively. MVD1 is set equal to (−MVD0). The final motion vectors are shown in below formula.

$$\{(mvx_0, mvy_0) = (mvpx_0 + mvdx_0,\ mvpy_0 + mvdy_0)(mvx_1, mvy_1) = (mvpx_1 - mvdx_0,\ mvpy_1 - mvdy_0) \tag{3-14}$$

In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

2.1.5 Affine Motion Compensated Prediction

Figure 10:
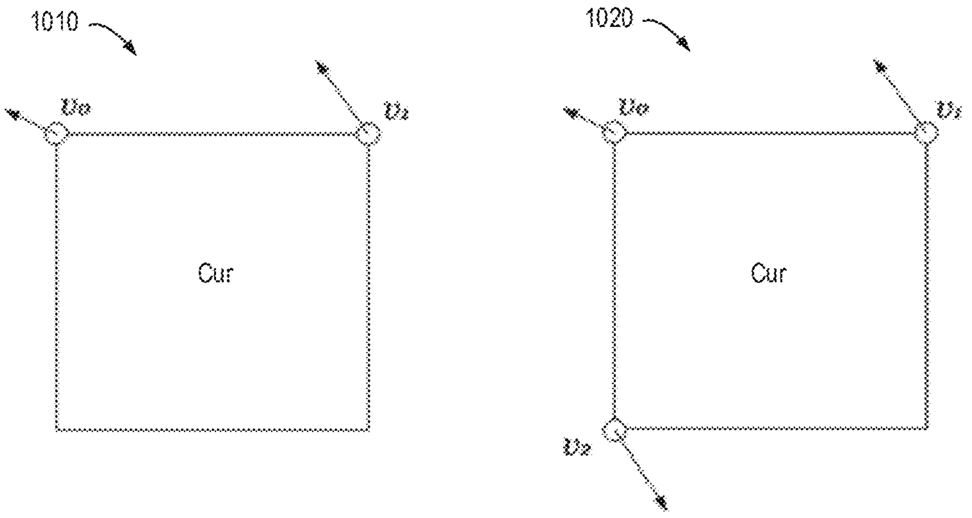
FIG. 10 illustrates control point based affine motion model.

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIG. 10, the affine motion field of the block is described by motion information of two control point (4-parameter) or three control point motion vectors (6-parameter).

For 4-parameter affine motion model, motion vector at sample location (x, y) in a block is derived as:

$$\{mv_x = \frac{mv_{1x} - mv_{0x}}{W}x + \frac{mv_{0y} - mv_{1y}}{W}y + mv_{0x}mv_y = \frac{mv_{1y} - mv_{0y}}{W}x + \frac{mv_{1x} - mv_{0x}}{W}y + mv_{0y} \tag{3-15}$$

For 6-parameter affine motion model, motion vector at sample location (x, y) in a block is derived as:

$$\{mv_x = \frac{mv_{1x} - mv_{0x}}{W}x + \frac{mv_{2x} - mv_{0x}}{H}y + mv_{0x}mv_y = \frac{mv_{1y} - mv_{0y}}{W}x + \frac{mv_{2y} - mv_{0y}}{H}y + mv_{0y} \tag{3-16}$$

Where ($mv_{0x}$, $mv_{0y}$) is motion vector of the top-left corner control point, ($mv_{1x}$, $mv_{1y}$) is motion vector of the top-right corner control point, and $(mv_{2x}, mv_{2y})$ is motion vector of the bottom-left corner control point.

Figure 11:
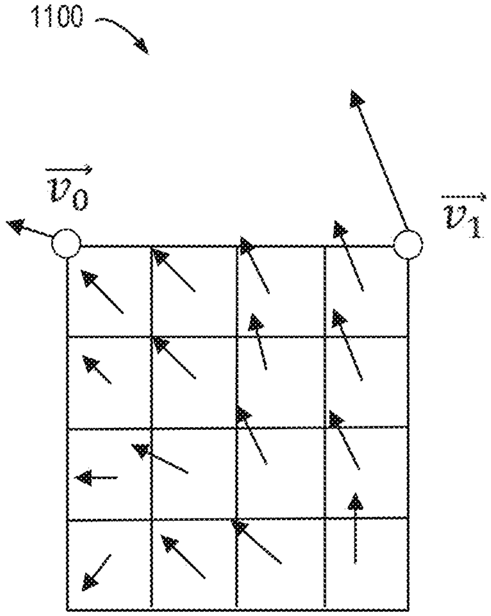
FIG. 11 illustrates affine MVF per subblock.

In order to simplify the motion compensation prediction, block based affine transform prediction is applied. To derive motion vector of each 4×4 luma subblock, the motion vector of the center sample of each subblock, as shown in FIG. 11, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

2.1.5.1 Affine Merge Prediction

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

- Inherited affine merge candidates that extrapolated from the CPMVs of the neighbour CUs;
- Constructed affine merge candidates CPMVPs that are derived using the translational MVs of the neighbour CUs;
- Zero MVs.

Figure 12:
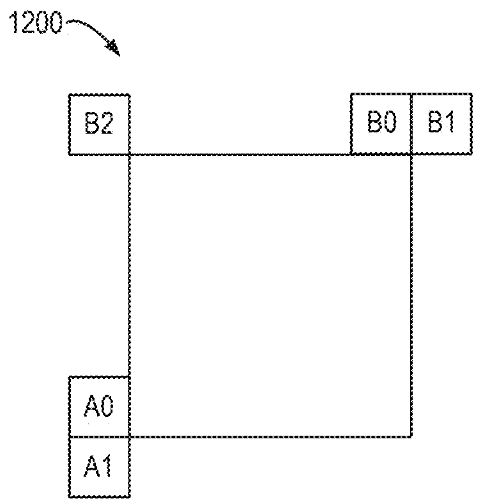
FIG. 12 illustrates locations of inherited affine motion predictors.
Figure 13:
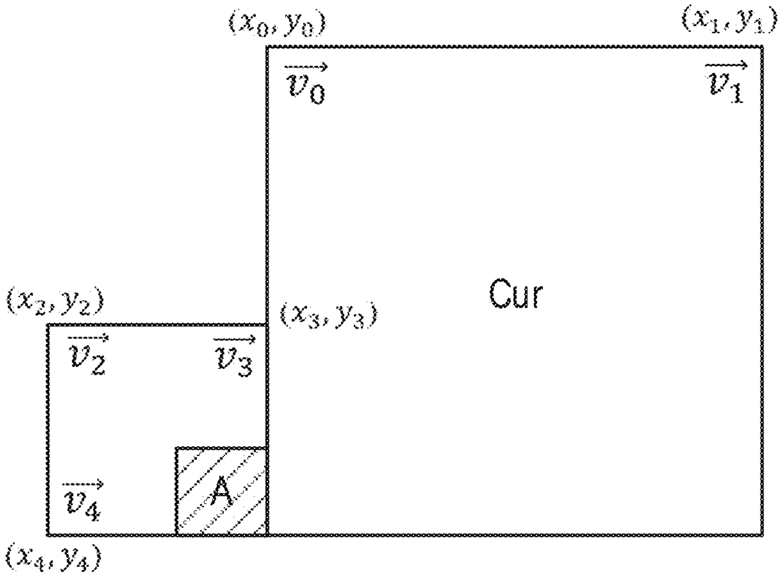
FIG. 13 illustrates control point motion vector inheritance.

In VVC, there are maximum two inherited affine candidates, which are derived from affine motion model of the neighboring blocks, one from left neighboring CUs and one from above neighboring CUs. The candidate blocks are shown in FIG. 12. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derived the CPMVP candidate in the affine merge list of the current CU. As shown in FIG. 13, if the neighbour left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbor translational motion information of each control point. The motion information for the control points is derived from the specified spatial neighbors and temporal neighbor shown in FIG. 14. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP is used as $CPMV_4$ if it's available.

After MVs of four control points are attained, affine merge candidates are constructed based on those motion information. The following combinations of control point MVs are used to construct in order:

$\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, $\{CPMV_1, CPMV_3\}$.

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.1.5.2 Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

- Inherited affine AMVP candidates that extrapolated from the CPMVs of the neighbour CUs;
- Constructed affine AMVP candidates CPMVPs that are derived using the translational MVs of the neighbour CUs;
- Translational MVs from neighboring CUs;
- Zero MVs.

The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Figure 14:
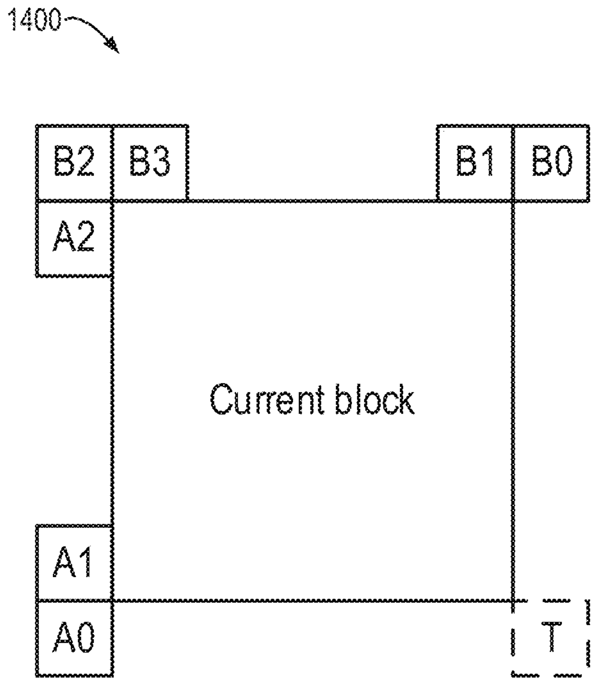
FIG. 14 illustrates locations of Candidates position for constructed affine merge mode.

Constructed AMVP candidate is derived from the specified spatial neighbors shown in FIG. 14. The same checking order is used as done in affine merge candidate construction. In addition, reference picture index of the neighboring block is also checked. The first block in the checking order that is inter coded and has the same reference picture as in current CUs is used. There is only one When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

2.1.5.3 Affine Motion Information Storage

In VVC, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion compensation, MV derivation of merge/AMVP list of translational MVs and deblocking.

Figure 15:
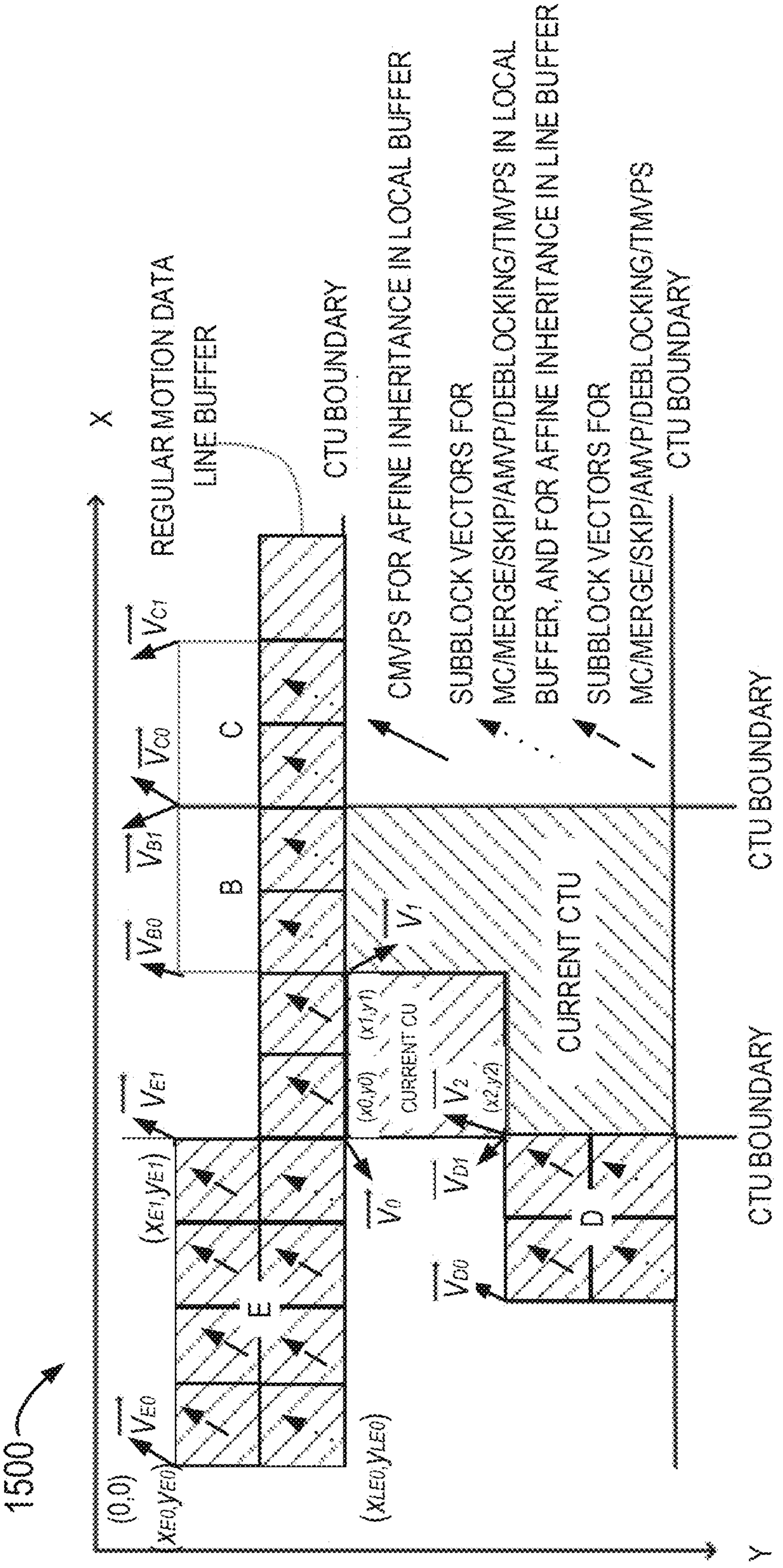
FIG. 15 illustrates motion vector usage for proposed combined method.

To avoid the picture line buffer for the additional CPMVs, affine motion data inheritance from the CUs from above CTU is treated differently to the inheritance from the normal neighboring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in local buffer. If the candidate CU is 6-parameter affine coded, the affine model is degraded to 4-parameter model. As shown in FIG. 15, along the top CTU boundary, the bottom-left and bottom right subblock motion vectors of a CU are used for affine inheritance of the CUs in bottom CTUs.

2.1.5.4 Prediction Refinement with Optical Flow for Affine Mode

Subblock based affine motion compensation can save memory access bandwidth and reduce computation complexity compared to pixel based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction I(i,j).

Step 2) The spatial gradients $g_x$(i,j) and $g_y$(i,j) of the subblock prediction are calculated at each sample location using a 3-tap filter [−1, 0, 1]. The gradient calculation is exactly the same as gradient calculation in BDOF.

$$g_x(i, j) = (I(i+1, j) >> \text{shift1}) - (I(i-1, j) >> \text{shift 1}) \quad (3\text{-}17)$$

$$g_y(i, j) = (I(i, j+1) >> \text{shift 1}) - (I(i, j-1) >> \text{shift1}) \quad (3\text{-}18)$$

shift1 is used to control the gradient's precision. The subblock (i.e. 4×4) prediction is extended by one sample on each side for the gradient calculation. To avoid additional memory bandwidth and additional interpolation computation, those extended samples on the extended borders are copied from the nearest integer pixel position in the reference picture.

Figure 16:
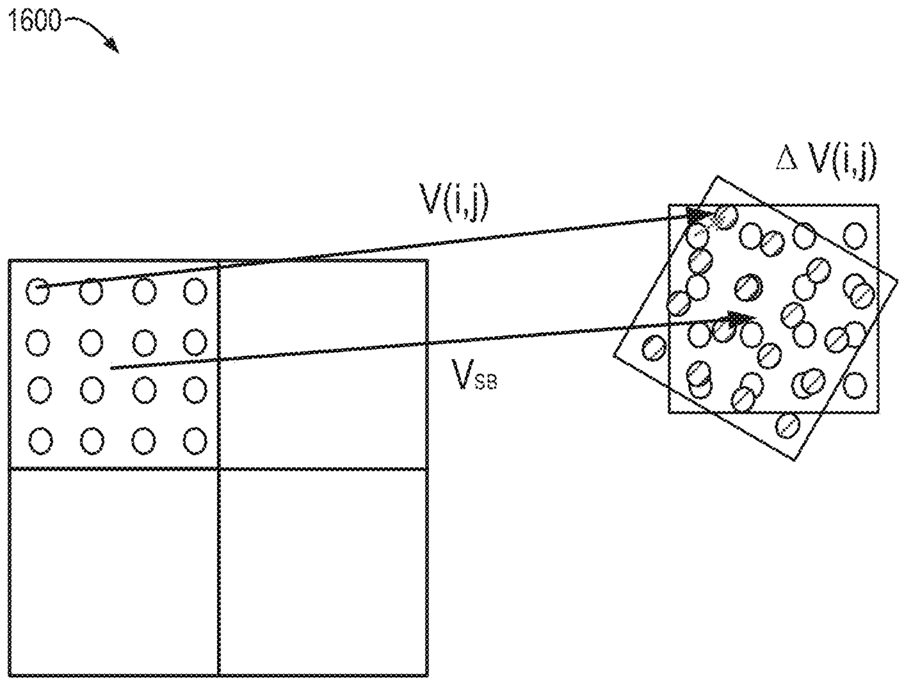
FIG. 16 illustrates subblock MV VSB and pixel $\Delta v(i,j)$ (gray arrow)

Step 3) The luma prediction refinement is calculated by the following optical flow equation.

$$\Delta I(i, j) = g_x(i, j) * \Delta v_x(i, j) + g_y(i, j) * \Delta v_y(i, j) \quad (3\text{-}19)$$

where the Δv(i,j) is the difference between sample MV computed for sample location (i,j), denoted by v(i,j), and the subblock MV of the subblock to which sample (i,j) belongs, as shown in FIG. 16. The Δv(i,j) is quantized in the unit of 1/32 luam sample precision.

Since the affine model parameters and the sample location relative to the subblock center are not changed from subblock to subblock, Δv(i,j) can be calculated for the first subblock, and reused for other subblocks in the same CU. Let dx(i,j) and dy(i,j) be the horizontal and vertical offset from the sample location (i,j) to the center of the subblock ($x_{SB}$, $y_{SB}$), Δv(x,y) can be derived by the following equation.

$$\{dx(i, j) = i - x_{SB}\; dy(i, j) = j - y_{SB} \quad (3\text{-}20)$$

$$\{\Delta v_x(i, j) = C * dx(i, j) + D * dy(i, j)\; \Delta v_y(i, j) = E * dx(i, j) + F * dy(i, j) \quad (3\text{-}21)$$

In order to keep accuracy, the enter of the subblock ($x_{SB}$, $y_{SB}$) is calculated as (($W_{SB}$−1)/2, ($H_{SB}$−1)/2), where $W_{SB}$ and $H_{SB}$ are the subblock width and height, respectively.

For 4-parameter affine model, $$\left\{C = F = \frac{v_{1x} - v_{0x}}{w} E = -D = \frac{v_{1y} - v_{0y}}{w} \right. \quad (3\text{-}22)$$

For 6-parameter affine model, $$\left\{C = \frac{v_{1x} - v_{0x}}{w} D = \frac{v_{2x} - v_{0x}}{h} E = \frac{v_{1y} - v_{0y}}{w} F = \frac{v_{2y} - v_{0y}}{h} \right. \quad (3\text{-}23)$$

where ($v_{0x}$,$v_{0y}$), ($v_{1x}$,$v_{1y}$), ($v_{2x}$,$v_{2y}$) are the top-left, top-right and bottom-left control point motion vectors, w and h are the width and height of the CU.

Step 4) Finally, the luma prediction refinement ΔI(i,j) is added to the subblock prediction I(i,j). The final prediction I' is generated as the following equation.

$$I'(i, j) = I(i, j) + \Delta I(i, j)$$

PROF is not be applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

2.1.6 Subblock-Based Temporal Motion Vector Prediction (SbTMVP)

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 17A:
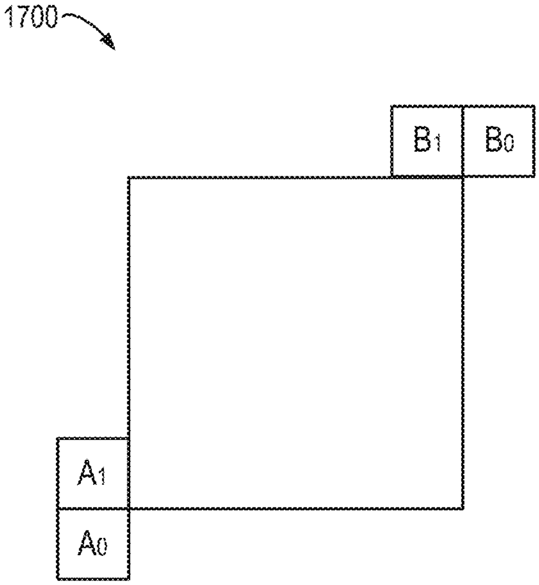
FIG. 17A illustrates spatial neighboring blocks used by ATVMP.
Figure 17B:
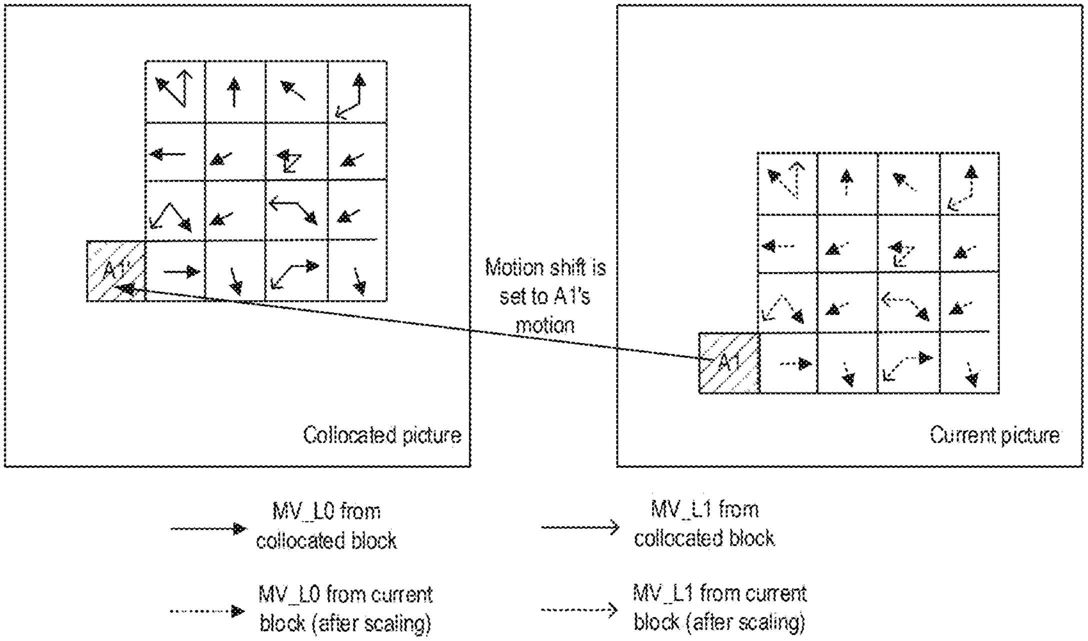
FIG. 17B illustrates deriving sub-CU motion field by applying a motion shift from spatial neighbor and scaling the motion information from the corresponding collocated sub-CUs.

The SbTVMP process is illustrated in FIGS. 17A and 17B. SbTMVP predicts the motion vectors of the sub-CUs within the current CU in two steps. In the first step, the spatial neighbor A1 in FIG. 17A is examined. If A1 has a motion vector that uses the collocated picture as its reference picture, this motion vector is selected to be the motion shift to be applied. If no such motion is identified, then the motion shift is set to (0, 0).

In the second step, the motion shift identified in Step 1 is applied (i.e. added to the current block's coordinates) to obtain sub-CU level motion information (motion vectors and reference indices) from the collocated picture as shown in FIG. 17B. The example in FIG. 17B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTVMP candidate and affine merge candidates is used for the signalling of subblock based merge mode. The SbTVMP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

2.1.7 Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate half-luma-sample or other MVD precisions (integer or four-luma sample) is used for normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for normal AMVP CU. In the case of affine AMVP CU, the second flag is used to indicate whether integer-luma-sample or 1/16 luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check four times for each MVD resolution, in VTM14, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For affine AMVP mode, if affine inter mode is not selected after checking rate-distortion costs of affine merge/skip mode, merge/skip mode, quarter-luma-sample MVD precision normal AMVP mode and quarter-luma-sample MVD precision affine AMVP mode, then 1/16 luma-sample MV precision and 1-pel MV precision affine inter modes are not checked. Furthermore affine parameters obtained in quarter-luma-sample MV precision affine inter mode is used as starting search point in 1/16 luma-sample and quarter-luma-sample MV precision affine inter modes.

2.1.8 Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8-w)*P_0 + w*P_1 + 4) >> 3 \qquad (3\text{-}24)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w={3,4,5}) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

2.1.9 Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order.

The distances (i.e. POC difference) from two reference pictures to the current picture are same.

Both reference pictures are short-term reference pictures.

The CU is not coded using affine mode or the SbTMVP merge mode.

CU has more than 64 luma samples.

Both CU height and CU width are larger than or equal to 8 luma samples.

BCW weight index indicates equal weight.

WP is not enabled for the current CU.

CIIP mode is not used for the current CU.

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0,1, of the two prediction signals are computed by directly calculating the difference between two neighboring samples, i.e., $$\frac{\partial I^{(k)}}{\partial x}(i, j) = \left(\left(I^{(k)}(i+1, j) >> \text{shift1}\right) - \left(I^{(k)}(i-1, j) >> \text{shift1}\right)\right) \quad (3\text{-}25)$$

$$\frac{\partial I^{(k)}}{\partial y}(i, j) = \left(\left(I^{(k)}(i, j+1) >> \text{shift1}\right) - \left(I^{(k)}(i, j-1) >> \text{shift1}\right)\right)$$

where $I^{(k)}(i,j)$ are the sample value at coordinate (i,j) of the prediction signal in list k, k=0,1, and shift1 is calculated based on the luma bit depth, bitDepth, as shift1=max(6, bitDepth−6).

Then, the auto- and cross-correlation of the gradients, $S_1$, $S_2$, $S_3$, $S_5$ and $S_6$, are calculated as $$S_1 = \sum_{(i,j)\in\Omega} \text{Abs}(\psi_x(i, j)),\ S_3 = \sum_{(i,j)\in\Omega} \theta(i, j)\cdot\text{Sign}(\psi_x(i, j)) \quad (3\text{-}1)$$

$$S_2 = \sum_{(i,j)\in\Omega} \psi_x(i, j)\cdot\text{Sign}(\psi_y(i, j))$$

$$S_5 = \sum_{(i,j)\in\Omega} \text{Abs}(\psi_y(i, j)),\ S_6 = \sum_{(i,j)\in\Omega} \theta(i, j)\cdot\text{Sign}(\psi_y(i, j))$$

where $$\psi_x(i, j) = \left(\frac{\partial I^{(1)}}{\partial x}(i, j) + \frac{\partial I^{(0)}}{\partial x}(i, j)\right) >> n_a$$

$$\psi_y(i, j) = \left(\frac{\partial I^{(1)}}{\partial y}(i, j) + \frac{\partial I^{(0)}}{\partial y}(i, j)\right) >> n_a \quad (3\text{-}27)$$

$$\theta(i, j) = \left(I^{(1)}(i, j) >> n_b\right) - \left(I^{(0)}(i, j) >> n_b\right)$$

where Ω is a 6×6 window around the 4×4 subblock, and the values of $n_a$ and $n_b$ are set equal to min(1, bitDepth−11) and min(4, bitDepth−8), respectively.

The motion refinement ($v_x$, $v_y$) is then derived using the cross- and auto-correlation terms using the following:

$$v_x = S_1 > 0\ ?\ clip3\left(-th'_{BIO},\ th'_{BIO},\ -\left(\left(S_3 \cdot 2^{n_b - n_\alpha}\right) >> \lfloor S_1 \rfloor\right)\right) : 0 \quad (3\text{-}28)$$

$$v_y = S_5 > 0\ ?\ clip3\left(-th'_{BIO},\ th'_{BIO},\ -\left(\left(S_6 \cdot 2^{n_b - n_\alpha} - \frac{\left((v_x S_{2,m}) << n_{S_2} + v_x S_{2,s}\right)}{2}\right) >> \lfloor S_5 \rfloor\right)\right) : 0$$

where $S_{2,m}=S_2>>n_{S_2}$, $S_{2,s}=S_2\&(2^{nS_2}-1)$, $th_{BIO}'=2^{max(5,BD-7)}$. $\lfloor\cdot\rfloor$ is the floor function, and $n_{S_2}=12$. Based on the motion refinement and the gradients, the following adjustment is calculated for each sample in the 4×4 subblock:

$$b(x, y) = rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right) \Big/ 2\right) \quad (1)$$

Finally, the BDOF samples of the CU are calculated by adjusting the bi-prediction samples as follows:

$$pred_{BDOF}(x, y) = \left(I^{(0)}(x, y) + I^{(1)}(x, y) + b(x, y) + 0_{offset}\right) >> \text{shift} \quad (3\text{-}30)$$

These values are selected such that the multipliers in the BDOF process do not exceed 15-bit, and the maximum bit-width of the intermediate parameters in the BDOF process is kept within 32-bit.

Figure 18:
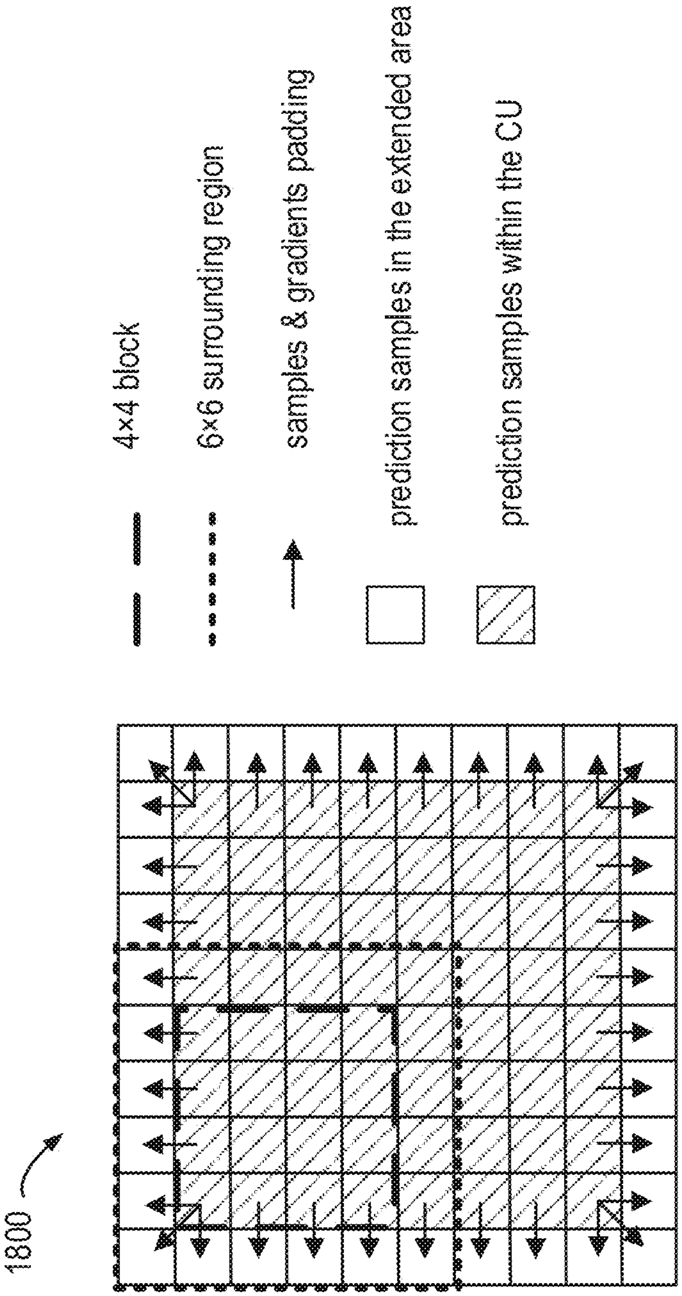
FIG. 18 illustrates extended CU region used in BDOF.

In order to derive the gradient values, some prediction samples $I^{(k)}(i,j)$ in list k (k=0,1) outside of the current CU boundaries need to be generated. As depicted in FIG. 18, the BDOF in VVC uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between the initial L0 and L1 prediction samples calculated in DVMR process is reused here.

If BCW is enabled for the current block, i.e., the BCW weight index indicates unequal weight, then bi-directional optical flow is disabled. Similarly, if WP is enabled for the current block, i.e., the luma_weight_1×_flag is 1 for either of the two reference pictures, then BDOF is also disabled. When a CU is coded with symmetric MVD mode or CIIP mode, BDOF is also disabled.

2.1.10 Decoder Side Motion Vector Refinement (DMVR)

Figure 19:
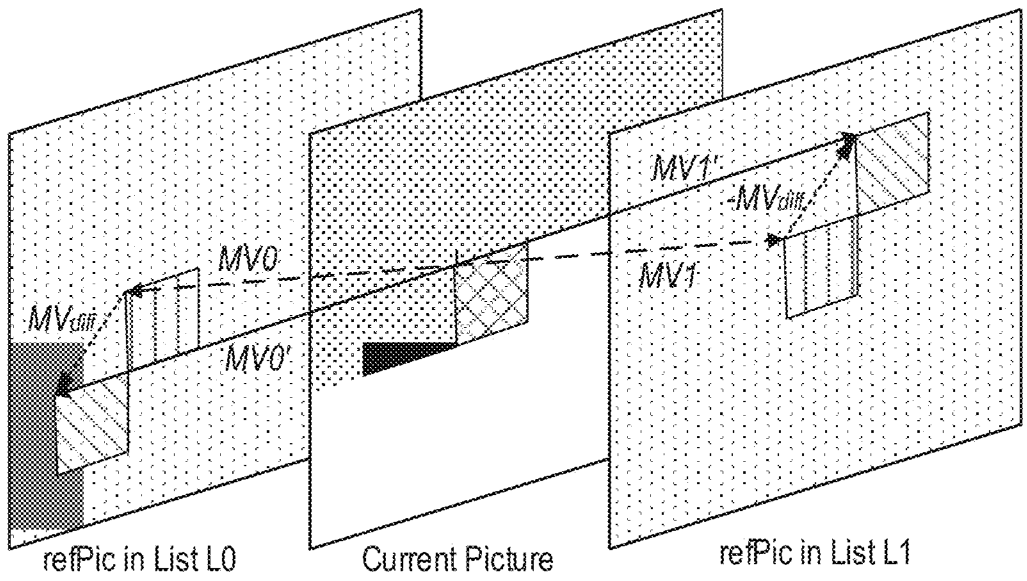
FIG. 19 illustrates decoder side motion vector refinement.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 19, the SAD between the red blocks based on each MV candidate around the initial MV is calculated. The MV candidate with the lowest SAD becomes the refined MV and used to generate the bi-predicted signal.

In VVC, the application of DMVR is restricted and is only applied for the CUS which are coded with following modes and features:

- CU level merge mode with bi-prediction MV;
- One reference picture is in the past and another reference picture is in the future with respect to the current picture;
- The distances (i.e. POC difference) from two reference pictures to the current picture are same;
- Both reference pictures are short-term reference pictures;
- CU has more than 64 luma samples;
- Both CU height and CU width are larger than or equal to 8 luma samples;
- BCW weight index indicates equal weight;
- WP is not enabled for the current block;
- CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.1.10.1 Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + \text{MV\_offset} \quad (3\text{-}31)$$

$$MV1' = MV1 - \text{MV\_offset} \quad (3\text{-}32)$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated.

If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-y_{min})^2+C \tag{3-33}$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0))); \tag{3-34}$$

$$y_{min}=(E(0,-1)-E(0,1))/(2((E(0,-1)+E(0,1)-2E(0,0))). \tag{3-35}$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

2.1.10.2 Bilinear-Interpolation and Sample Padding

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.1.10.3 Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.1.11 Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size $w\times h=2^m\times 2^n$ with m, n∈{3 . . . 6} excluding 8×64 and 64×8.

Figures 20, 21:
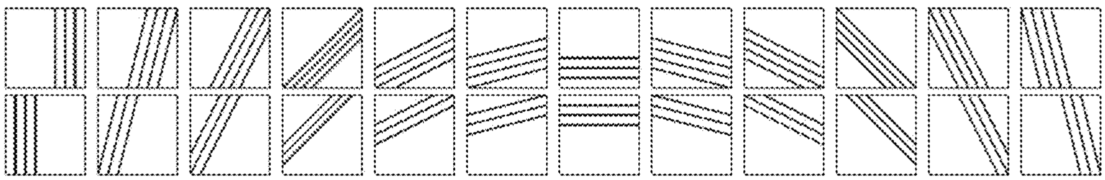
FIG. 20 illustrates examples of the GPM splits grouped by identical angles.
FIG. 21 illustrates uni-prediction MV selection for geometric partitioning mode.

When this mode is used, a CU is split into two parts by a geometrically located straight line (FIG. 20). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 3.4.11.1.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 3.4.11.2. This is the prediction signal for the whole CU, and transform and quantization process will be applied to the whole CU as in other prediction modes. Finally, the motion field of a CU predicted using the geometric partition modes is stored as in 3.4.11.3.

2.1.11.1 Uni-Prediction Candidate List Construction

The uni-prediction candidate list is derived directly from the merge candidate list constructed according to the extended merge prediction process in 3.4.1. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in FIG. 21. In case a corresponding LX motion vector of the n-the extended merge candidate does not exist, the L(1-X) motion vector of the same candidate is used instead as the uni-prediction motion vector for geometric partitioning mode.

2.1.11.2 Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos\cos(\varphi_i) + (2y + 1 - h)\sin\sin(\varphi_i) - \rho_j \quad (3\text{-}36)$$

$$\rho_j = \rho_{x,j}\cos\cos(\varphi_i) + \rho_{y,j}\sin\sin(\varphi_i) \quad (3\text{-}37)$$

$$\rho_{x,j} = \{0 \;\; i \,\%\, 16 = 8 \text{ or } (i \,\%\, 16 \neq 0 \text{ and } h \geq w) \pm (j \times w) >> 2 \text{ otherwise} \quad (3\text{-}38)$$

$$\rho_{y,j} = \{\pm(j \times h) >> 2 \;\; i \,\%\, 16 = 8 \text{ or } (i \,\%\, 16 \neq 0 \text{ and } h \geq w)\; 0 \text{ otherwise} \quad (3\text{-}39)$$

where i, j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx\ ?\ 32 + d(x, y) : 32 - d(x, y) \quad (3\text{-}40)$$

$$w_0(x, y) = \frac{Clip3(0, 8(wIdxL(x, y) + 4) >> 3)}{8} \quad (3\text{-}41)$$

$$w_1(x, y) = 1 - w_0(x, y) \quad (3\text{-}42)$$

Figure 22:
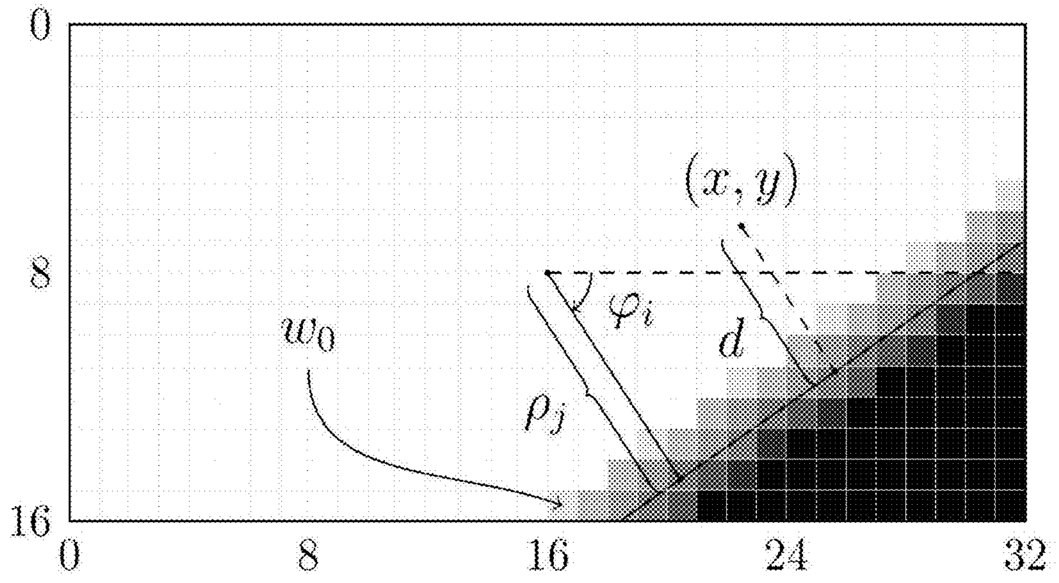
FIG. 22 illustrates exemplified generation of a bending weight $w_0$ using geometric partitioning mode.

The partIdx depends on the angle index i. One example of weigh $w_0$ is illustrated in FIG. 22.

2.1.11.3 Motion Field Storage for Geometric Partitioning Mode

Mv1 from the first part of the geometric partition, Mv2 from the second part of the geometric partition and a combined My of Mv1 and Mv2 are stored in the motion filed of a geometric partitioning mode coded CU. The stored motion vector type for each individual position in the motion filed are determined as:

$$sType = \text{abs}(motionIdx) < 32\ ?\ 2 : (motionIdx \leq 0\ ?\ (1 - partIdx) : partIdx) \quad (3\text{-}43)$$

where motionIdx is equal to d(4x+2,4y+2), which is recalculated from equation (3-36). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined My are generated using the following process:

1) If Mv1 and Mv2 are from different reference picture lists (one from L0 and the other from L1), then Mv1 and Mv2 are simply combined to form the bi-prediction motion vectors.
2) Otherwise, if Mv1 and Mv2 are from the same list, only uni-prediction motion Mv2 is stored.

2.1.12 Combined Inter and Intra Prediction (CIIP)

Figure 23:
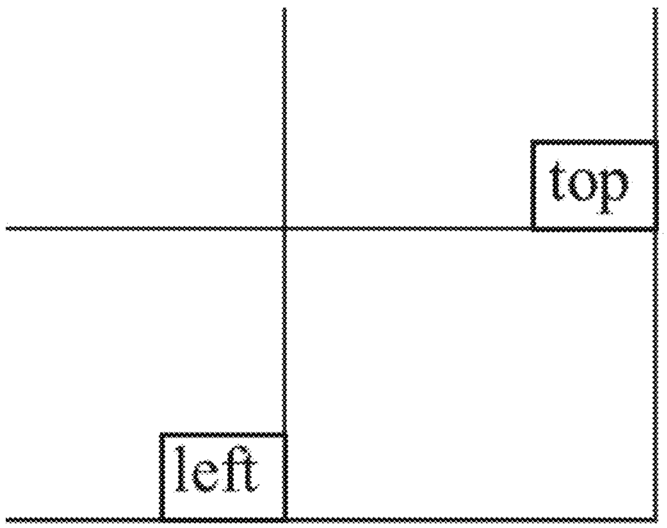
FIG. 23 illustrates top and left neighboring blocks used in CIIP weight derivation.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 23) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP} = ((4 - wt) * P_{inter} + wt * P_{intra} + 2) >> 2. \quad (3\text{-}42)$$

2.1.13 Reference Picture Resampling (RPR)

In HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded. In order to avoid additional processing steps, the RPR process in VVC is designed to be embedded in the motion compensation process and performed at the block level. In the motion compensation stage, the scaling ratio is used together with motion information to locate the reference samples in the reference picture to be used in the interpolation process.

In VVC, the scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. It is worthy noted that the filter set of normal MC interpolation is used in the case of scaling ratio ranging from 1/1.25 to 8. Actually the normal MC interpolation process is a special case of the resampling process with scaling ratio ranging from 1/1.25 to 8. In addition to conventional translational block motion, the affine mode has three sets of 6-tap interpolation filters that are used for the luma component to cover the different scaling ratios in RPR. The horizontal and vertical scaling ratios are derived based on picture width and height, and the left, right, top and bottom scaling offsets specified for the reference picture and the current picture.

For support of this feature, the picture resolution and the corresponding conformance window are signalled in the PPS instead of in the SPS, while in the SPS the maximum picture resolution is signalled.

2.1.14 Miscellaneous Inter Prediction Aspects 2.2 To reduce memory bandwidth, the inter-coded 4×4 size CU is not allowed in VVC. For inter-coded 4×8/8×4 CU, only uni-directional mode is allowed. When the motion information from merge mode is bi-directional, it is converted to uni-directional by keeping only the list 0 motion information.

3 INTER PREDICTION TOOLS UNDER INVESTIGATION IN ECM 3.1 Local Illumination Compensation (LIC)

LIC is an inter prediction technique to model local illumination variation between current block and its prediction block as a function of that between current block template and reference block template. The parameters of the function can be denoted by a scale α and an offset β, which forms a linear equation, that is, $\alpha * p[x] + \beta$ to compensate illumination changes, where p[x] is a reference sample pointed to by MV at a location x on reference picture. Since α and β can be derived based on current block template and reference block template, no signaling overhead is required for them, except that an LIC flag is signaled for AMVP mode to indicate the use of LIC. The local illumination compensation is used for uni-prediction inter CUs with the following modifications.

- Intra neighbor samples can be used in LIC parameter derivation;
- LIC is disabled for blocks with less than 32 luma samples;
- For both non-subblock and affine modes, LIC parameter derivation is performed based on the template block samples corresponding to the current CU, instead of partial template block samples corresponding to first top-left 16×16 unit;
- Samples of the reference block template are generated by using MC with the block MV without rounding it to integer-pel precision.

3.2 Non-Adjacent Spatial Candidate

Figure 24:
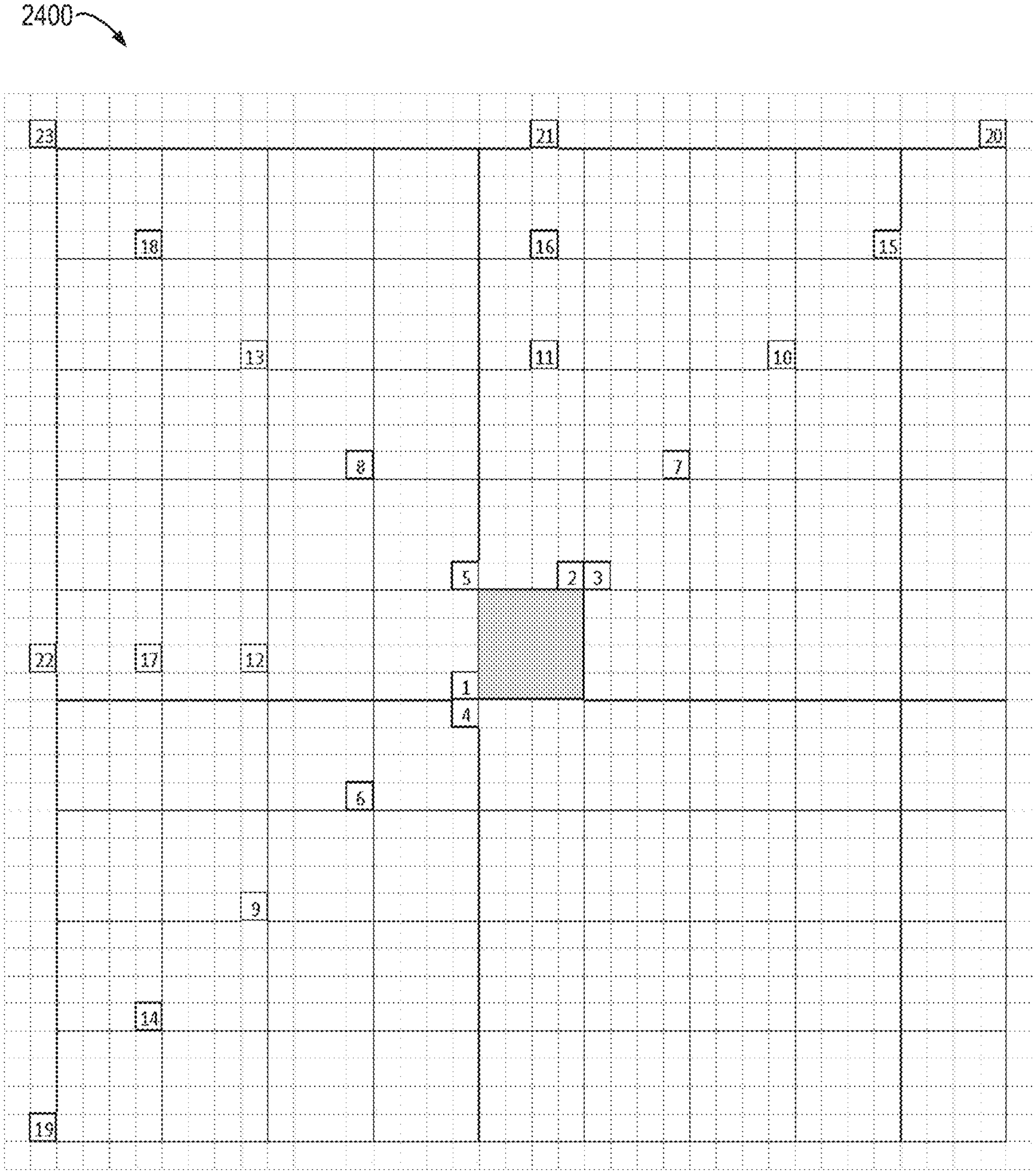
FIG. 24 illustrates spatial neighboring blocks used to derive the spatial merge candidates.

The non-adjacent spatial merge candidates are inserted after the TMVP in the regular merge candidate list. The pattern of spatial merge candidates is shown in FIG. 24. The distances between non-adjacent spatial candidates and current coding block are based on the width and height of current coding block. The line buffer restriction is not applied.

3.3 Template Matching (TM)

Figure 25:
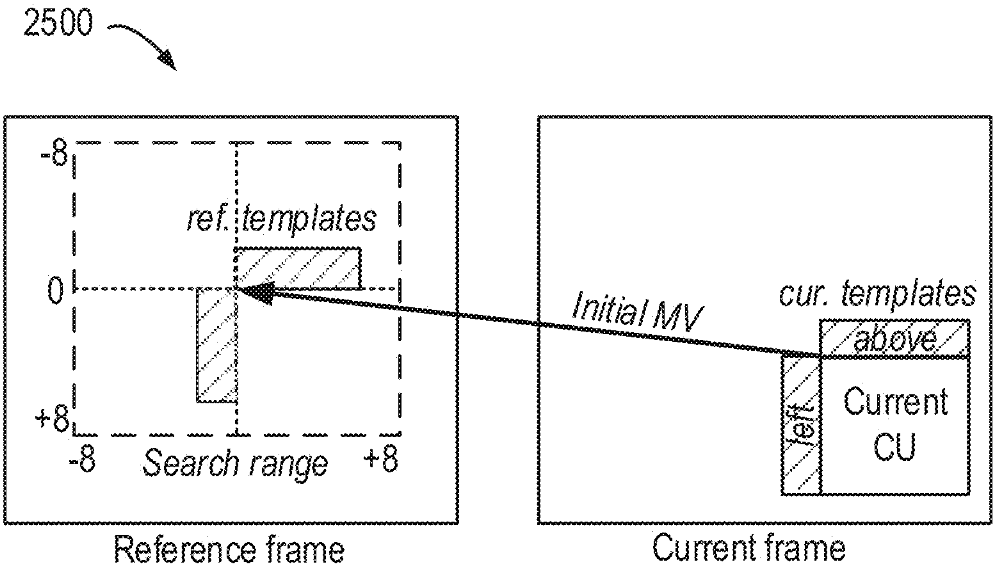
FIG. 25 illustrates template matching performs on a search area around initial MV.

Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. As illustrated in FIG. 25, a better MV is searched around the initial motion of the current CU within a [−8, +8]-pel search range. The template matching method is used with the following modifications: search step size is determined based on AMVR mode and TM can be cascaded with bilateral matching process in merge modes.

In AMVP mode, an MVP candidate is determined based on template matching error to select the one which reaches the minimum difference between the current block template and the reference block template, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keeps the same MV precision as indicated by the AMVR mode after TM process.

TABLE 1

Search patterns of AMVR and merge mode with AMVR.

| Search pattern | AMVR mode 4-pel | AMVR mode Full-pel | AMVR mode Half-pel | AMVR mode Quarter-pel | Merge mode AltIF = 0 | Merge mode AltIF = 1 |
|---|---|---|---|---|---|---|
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As Table 1 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

3.4 Multi-Pass Decoder-Side Motion Vector Refinement

A multi-pass decoder-side motion vector refinement is applied. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

3.4.1 First Pass Block Based Bilateral Matching MV Refinement

In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=myDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range. The existing fractional sample refinement is further applied to derive the final deltaMV. The refined MVs after the first pass is then derived as:

MV0_pass1=MV0+deltaMV;

MV1_pass1=MV1−deltaMV.

3.4.2 Second Pass Subblock Based Bilateral Matching MV Refinement

In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2 (sbIdx2) and MV1_pass2 (sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

Figure 26:
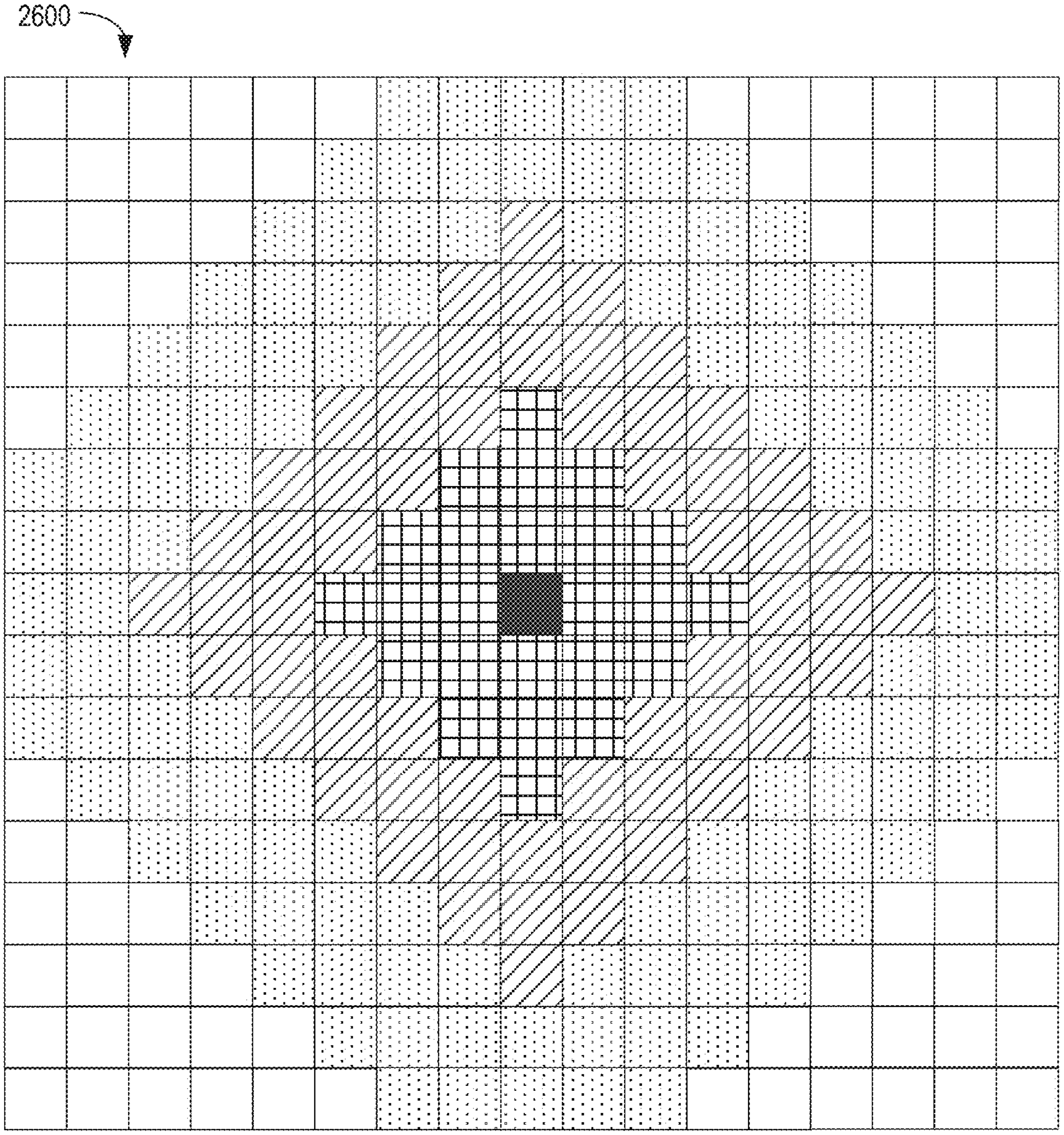
FIG. 26 illustrates diamond regions in the search area.

The bilateral matching cost is calculated by applying a cost factor to the SATD cost between two reference sub-blocks, as: bilCost=satdCost*costFactor. The search area (2*sHor+1)*(2*sVer+1) is divided up to 5 diamond shape search regions shown on FIG. 26. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined.

The existing VVC DMVR fractional sample refinement is further applied to derive the final deltaMV (sbIdx2). The refined MVs at second pass is then derived as:

MV0_pass2(sbIdx2)=MV0_pass1+deltaMV(sbIdx2);

MV1_pass2(sbIdx2)=MV1_pass1-deltaMV(sbIdx2).

3.4.3 Third Pass-Subblock Based Bi-Directional Optical Flow MV Refinement

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv (Vx, Vy) is rounded to 1/16 sample precision and clipped between −32 and 32.

The refined MVs (MV0_pass3 (sbIdx3) and MV1_pass3 (sbIdx3)) at third pass are derived as:

MV0_pass3(sbIdx3)=MV0_pass2(sbIdx2)+bioMy;

MV1_pass3(sbIdx3)=MV0_pass2(sbIdx2)−bioMv.

3.5 OBMC

When OBMC is applied, top and left boundary pixels of a CU are refined using neighboring block's motion information with a weighted prediction.

Conditions of not applying OBMC are as follows:

When OBMC is disabled at SPS level;

When current block has intra mode or IBC mode;

When current block applies LIC;

When current luma block area is smaller or equal to 32.

A subblock-boundary OBMC is performed by applying the same blending to the top, left, bottom, and right subblock boundary pixels using neighboring subblocks' motion information. It is enabled for the subblock based coding tools:

Affine AMVP modes;

Affine merge modes and subblock-based temporal motion vector prediction (SbTMVP);

Subblock-based bilateral matching.

3.6 Sample-Based BDOF

In the sample-based BDOF, instead of deriving motion refinement (Vx, Vy) on a block basis, it is performed per sample.

The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

3.7 Interpolation

Figure 27:
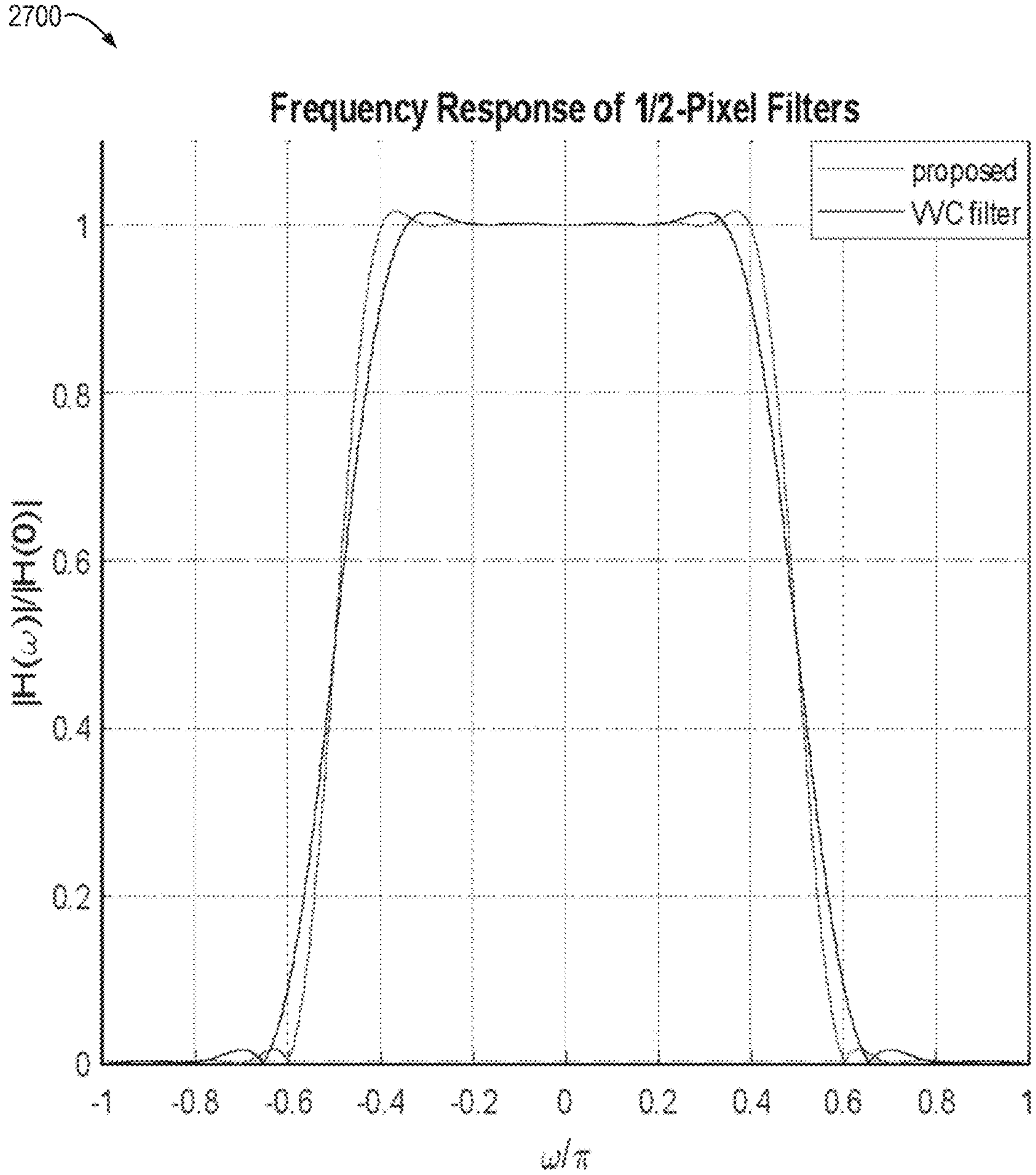
FIG. 27 illustrates frequency responses of the interpolation filter and the VVC interpolation filter at half-pel phase.

The 8-tap interpolation filter used in VVC is replaced with a 12-tap filter. The interpolation filter is derived from the sinc function of which the frequency response is cut off at Nyquist frequency, and cropped by a cosine window function. Table 2 gives the filter coefficients of all 16 phases. FIG. 27 compares the frequency responses of the interpolation filters with the VVC interpolation filter, all at half-pel phase.

TABLE 2

| Filter coefficients of the 12-tap interpolation filter | | | | | | | | | | | | |
|---|---|---|---|---|---|---|---|---|---|---|---|---|
| 1/16 | −1 | 2 | −3 | 6 | −14 | 254 | 16 | −7 | 4 | −2 | 1 | 0 |
| 2/16 | −1 | 3 | −7 | 12 | −26 | 249 | 35 | −15 | 8 | −4 | 2 | 0 |
| 3/16 | −2 | 5 | −9 | 17 | −36 | 241 | 54 | −22 | 12 | −6 | 3 | −1 |
| 4/16 | −2 | 5 | −11 | 21 | −43 | 230 | 75 | −29 | 15 | −8 | 4 | −1 |
| 5/16 | −2 | 6 | −13 | 24 | −48 | 216 | 97 | −36 | 19 | −10 | 4 | −1 |
| 6/16 | −2 | 7 | −14 | 25 | −51 | 200 | 119 | −42 | 22 | −12 | 5 | −1 |
| 7/16 | −2 | 7 | −14 | 26 | −51 | 181 | 140 | −46 | 24 | −13 | 6 | −2 |
| 8/16 | −2 | 6 | −13 | 25 | −50 | 162 | 162 | −50 | 25 | −13 | 6 | −2 |
| 9/16 | −2 | 6 | −13 | 24 | −46 | 140 | 181 | −51 | 26 | −14 | 7 | −2 |
| 10/16 | −1 | 5 | −12 | 22 | −42 | 119 | 200 | −51 | 25 | −14 | 7 | −2 |
| 11/16 | −1 | 4 | −10 | 19 | −36 | 97 | 216 | −48 | 24 | −13 | 6 | −2 |

TABLE 2-continued

| Filter coefficients of the 12-tap interpolation filter | | | | | | | | | | | | |
|---|---|---|---|---|---|---|---|---|---|---|---|---|
| 12/16 | −1 | 4 | −8 | 15 | −29 | 75 | 230 | −43 | 21 | −11 | 5 | −2 |
| 13/16 | −1 | 3 | −6 | 12 | −22 | 54 | 241 | −36 | 17 | −9 | 5 | −2 |
| 14/16 | 0 | 2 | −4 | 8 | −15 | 35 | 249 | −26 | 12 | −7 | 3 | −1 |
| 15/16 | 0 | 1 | −2 | 4 | −7 | 16 | 254 | −14 | 6 | −3 | 2 | −1 |

3.8 Multi-Hypothesis Prediction (MHP)

In the multi-hypothesis inter prediction mode, one or more additional motion-compensated prediction signals are signaled, in addition to the conventional bi prediction signal. The resulting overall prediction signal is obtained by sample-wise weighted superposition. With the bi prediction signal $p_{bi}$ and the first additional inter prediction signal/hypothesis $h_3$, the resulting prediction signal $p_3$ is obtained as follows:

$$p_3 = (1-\alpha)p_{bi} + \alpha h_3.$$

The weighting factor α is specified by the new syntax element add_hyp_weight_idx, according to the following mapping.

| add_hyp_weight_idx | α |
|---|---|
| 0 | 1/4 |
| 1 | −1/8 |

Analogously to above, more than one additional prediction signal can be used. The resulting overall prediction signal is accumulated iteratively with each additional prediction signal.

$$p_{n+1} = (1-\alpha_{n+1})p_n + \alpha_{n+1}h_{n+1}$$

The resulting overall prediction signal is obtained as the last $p_n$ (i.e., the $p_n$ having the largest index n). Within this EE, up to two additional prediction signals can be used (i.e., n is limited to 2).

The motion parameters of each additional prediction hypothesis can be signaled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode. Combination of MHP and BDOF is possible, however the BDOF is only applied to the bi-prediction signal part of the prediction signal (i.e., the ordinary first two hypotheses).

3.9 Adaptive Reordering of Merge Candidates with Template Matching (ARMC-TM)

The merge candidates are adaptively reordered with template matching (TM). The reordering method is applied to regular merge mode, template matching (TM) merge mode, and affine merge mode (excluding the SbTMVP candidate). For the TM merge mode, merge candidates are reordered before the refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on template matching. For simplification, merge candidates in the last but not the first subgroup are not reordered.

The template matching cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

Figure 28:
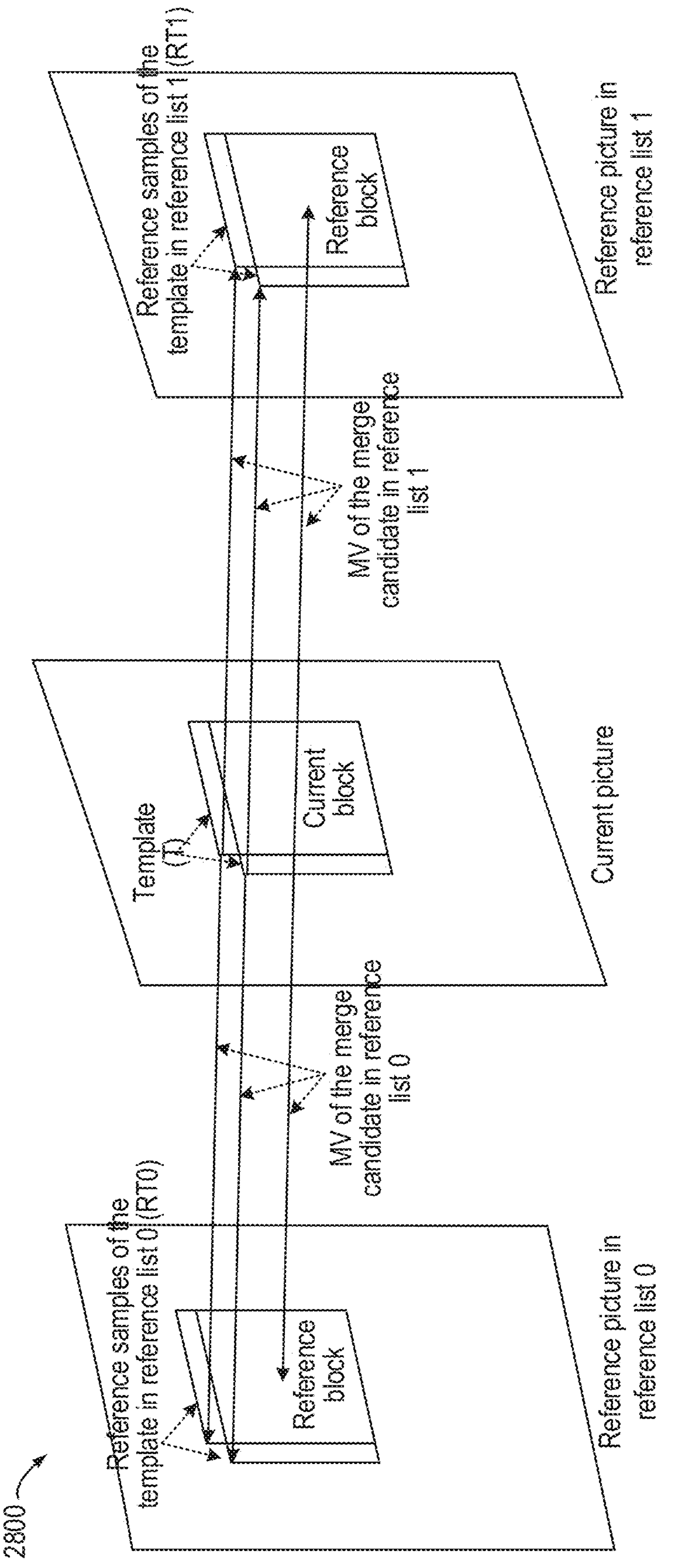
FIG. 28 illustrates template and reference samples of the template in reference pictures.

When a merge candidate utilizes bi-directional prediction, the reference samples of the template of the merge candidate are also generated by bi-prediction as shown in FIG. 28.

Figure 29:
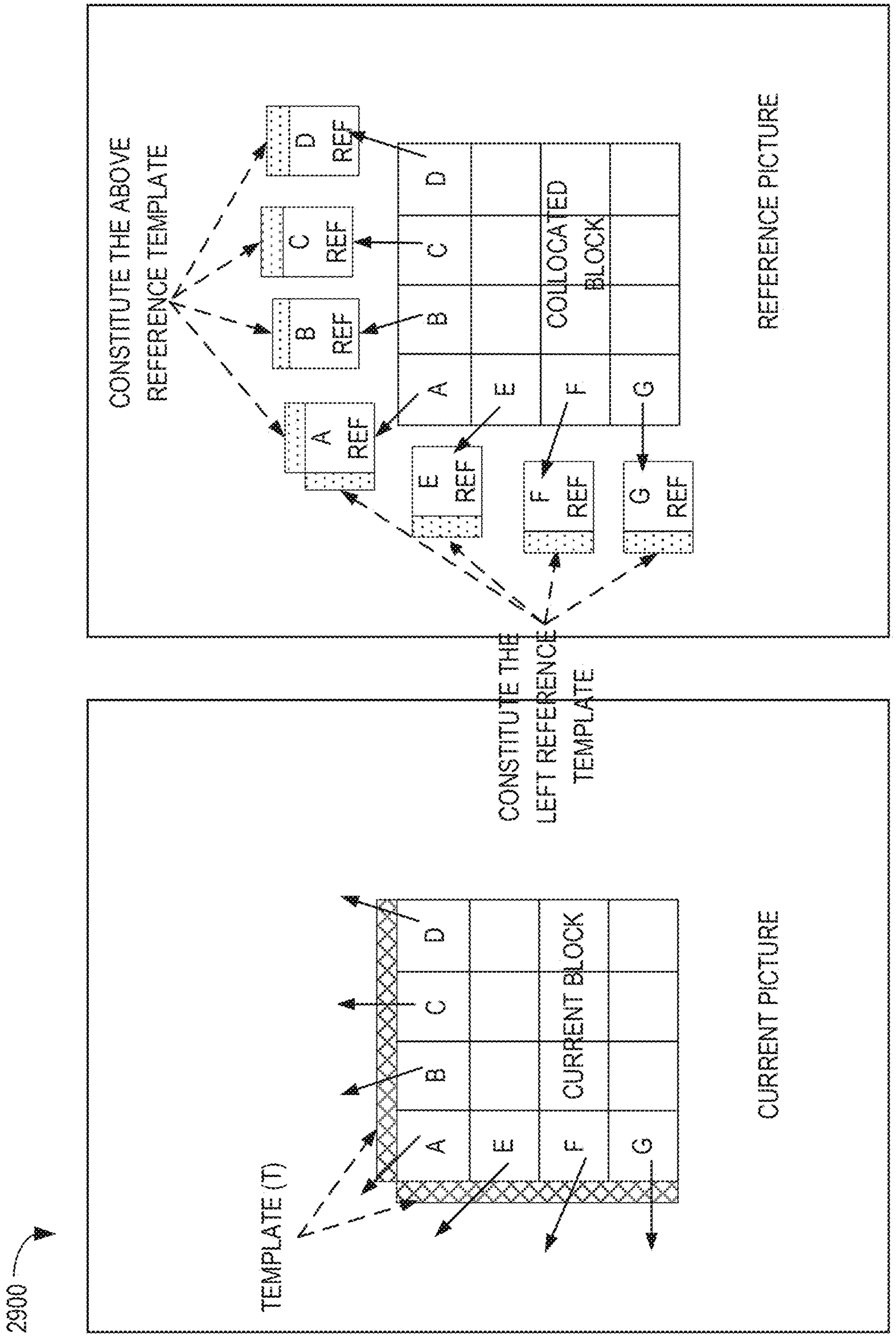
FIG. 29 illustrates template and reference samples of the template for block with sub-block motion using the motion information of the subblocks of the current block.

For subblock-based merge candidates with subblock size equal to Wsub×Hsub, the above template comprises several sub-templates with the size of Wsub×1, and the left template comprises several sub-templates with the size of 1×Hsub. As shown in FIG. 29, the motion information of the subblocks in the first row and the first column of current block is used to derive the reference samples of each sub-template.

3.10 Geometric Partitioning Mode (GPM) with Merge Motion Vector Differences (MMVD)

GPM in VVC is extended by applying motion vector refinement on top of the existing GPM uni-directional MVs. A flag is first signalled for a GPM CU, to specify whether this mode is used. If the mode is used, each geometric partition of a GPM CU can further decide whether to signal MVD or not. If MVD is signalled for a geometric partition, after a GPM merge candidate is selected, the motion of the partition is further refined by the signalled MVDs information. All other procedures are kept the same as in GPM.

The MVD is signaled as a pair of distance and direction, similar as in MMVD. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved in GPM with MMVD (GPM-MMVD). In addition, when pic_fpel_mmvd_enabled_flag is equal to 1, the MVD is left shifted by 2 as in MMVD.

3.11 Geometric Partitioning Mode (GPM) with Template Matching (TM)

Template matching is applied to GPM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 3. The motion is then refined by minimizing the difference between the current template and the template in the reference picture using the same search pattern of merge mode with half-pel interpolation filter disabled.

TABLE 3

Template for the 1st and 2nd geometric partitions, where A represents using above samples, L represents using left samples, and L + A represents using both left and above samples.

| | Partition angle | | | | | | | | | |
|---|---|---|---|---|---|---|---|---|---|---|
| | 0 | 2 | 3 | 4 | 5 | 8 | 11 | 12 | 13 | 14 |
| 1st partition | A | A | A | A | L + A | L + A | L + A | L + A | A | A |
| 2nd partition | L + A | L + A | L + A | L | L | L | L | L + A | L + A | L + A |
| | **Partition angle** | | | | | | | | | |
| | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

A GPM candidate list is constructed as follows:

1. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.
2. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.
3. Zero MV candidates are padded until the GPM candidate list is full.
4. The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

4 PROBLEMS

The existing design for illumination compensation has template-based model parameter derivation. However, the derived parameters may not be optimal for the current block. This motivates for a method to refine the model parameters for illumination compensation.

5 DETAILED SOLUTIONS

To solve the above problem and some other problems not mentioned, methods as summarized below are disclosed. The solutions should be considered as examples to explain the general concepts and should not be interpreted in a narrow way. Furthermore, these solutions can be applied individually or combined in any manner. Although the solution is disclosed for template-based derivation of LIC parameters, the disclosed method is applicable for other design approaches of LIC such as reconstructing a portion of block to determine LIC parameters.

The disclosed method is applicable in other scenarios where illumination compensation is employed such as inter-view prediction in multi-view coding.

The term 'block' may represent a coding block (CB), a CU, a PU, a PB.

1. Regarding the method to refine the model parameters for illumination compensation, the following approaches are disclosed.
   1) In one example, for a block coded with LIC, a value $\Delta\alpha$ and/or a value $\Delta\beta$ may be applied such that the updated LIC model parameters may be $\alpha+\Delta\alpha$ and/or $\beta+\Delta\beta$.
      a. In one example, extra operations such as shifting or clipping may be applied to $\alpha+\Delta\alpha$ and/or $\beta+\Delta\beta$ to get the final $\alpha$ and/or $\beta$ in LIC.
      b. The block may be with a specific mode such as AMVP or affine-AMVP or merge or sub-block merge.
      c. In one example, the choice of refinement parameter values depends on factors such as:
         i. For example, the values of $\Delta\alpha$ and $\Delta\beta$ and the total number of such values depends on various factors like block size, QP value, etc.
         ii. For example, different value/s are employed at the sequence/picture/slice level.
         iii. For example, the values are updated dynamically based on the previously observed statistics.
      d. In one example, refinement parameters are used under certain conditions like for certain sequences or frames or block sizes and QP values.
      e. In one example, the above mentioned methods are applied for all color planes or a subset of them.
         i. In one example, the refinement parameter/s employed for each plane is different.
         ii. In one example, all or a subset of color planes share the same refinement parameter/s.
      f. $\Delta\alpha$ and/or $\Delta\beta$ may be signaled at picture/slice/tile/CTU/CU/PU/TU level.
         i. In one example, $\Delta\alpha$ and/or $\Delta\beta$ may be selected from a candidate set and an index is signaled to indicate which is selected.
         ii. In one example, $\Delta\alpha$ and/or $\Delta\beta$ may be in a form of K*step, where step is a predefined number such as 1/64 or 1/32, and K may be signaled to indicate $\Delta\alpha$ and/or $\Delta\beta$.
         iii. The candidate set may depend on coding information such as slice/picture type, temporal layer, QP, block size, coding mode, color component, etc.
         iv. $\Delta\alpha$ and/or $\Delta\beta$ may be coded in a predictive way.

a) $\Delta\alpha$ and/or $\Delta\beta$ may be predicted by $\Delta\alpha$ and/or $\Delta\beta$ of neighbouring blocks.

v. In one example, the syntax element to indicate $\Delta\alpha$ and/or $\Delta\beta$ may be binarized as fixed length code, (truncated) unary code, exponential Golomb code, etc.

vi. In one example, the syntax element to indicate $\Delta\alpha$ and/or $\Delta\beta$ may be coded with at least one coding context in arithmetic coding.

a) Alternatively, the syntax element to indicate $\Delta\alpha$ and/or $\Delta\beta$ may be coded with bypass coding.

vii. In one example, the sign and absolute value of $\Delta\alpha$ and/or $\Delta\beta$ may be coded separately.

viii. In one example, the candidate set of $\Delta\alpha$ and/or $\Delta\beta$ may be signaled such as in slice header/picture header/PPS/SPS/APS/etc.

2) In one example, for a block coded with a MV candidate list with at least one candidate with LIC flag enabled (denoted as the X candidate), at least one additional candidate may be inserted into the candidate list.

a. In one example, the block may be coded with a specific mode such as merge, MMVD, CIIP, affine-merge, subblock merge, template matching merge, etc.

b. The MV candidate list may be a merge list, an affine-merge list, template matching merge list, etc.

c. In one example, the new merge candidate may inherit all the information of the X candidate, and in addition applies refine parameters $\Delta\alpha$ and/or $\Delta\beta$.

i. For example, the choice and usage of $\Delta\alpha$ and/or $\Delta\beta$ follows similar rationale as previously disclosed for bullet 1.

ii. For example, only a subset of candidates is considered for constructing new merge candidates with refinement parameters.

iii. For example, the choice of $\Delta\alpha$ and/or $\Delta\beta$ are further conditioned on the type of merge mode, for example affine mmvd, regular merge etc.

d. The additional candidate may be added into the list (just) after the X candidate.

e. Multiple additional candidates may be added for the X candidate with different $\Delta\alpha$ and/or $\Delta\beta$.

f. Multiple X candidates may be considered if there are more than one candidates in the list with LIC flag on.

3) In one example, for merge, mode, instead of adding new merge candidate/s, refinement parameters are applied similar to AMVP mode and the value/s and the usage could further depend on:

i. For example, the type of merge mode;

ii. For example, factors such as block size, QP, and other conditions as listed for AMVP mode.

4) In one example, a syntax element (e.g., a flag) may be signaled in the bitstream to specify whether the disclosed parameter is finally chosen for the current block coding.

a. Furthermore, the syntax element may depend on whether the block is AMVP coded or merge coded.

b. Alternatively, furthermore, the syntax element may depend on whether the block is uni-predicted or bi-predicted.

c. Alternatively, furthermore, the syntax element may depend on the type of the merge prediction used.

d. Alternatively, furthermore, the syntax element is signalled only for a subset or all of Y, U, V planes.

e. Alternatively, furthermore, the syntax element may be conditionally signalled.

f. Whether to/how to signal the syntax element may depend on the dimension of the current block.

i. For example, the syntax element may be only signalled in case of the current block is greater than a pre-defined size.

ii. For example, the syntax element may be only signalled in case of the sum of width and height of current block is greater than a pre-defined threshold.

iii. greater than may be replaced by "lower than" or "no greater than" or "no lower than".

g. Whether to/how to signal the syntax element may depend on the QP chosen to code the current block.

i. For example, the syntax element may be only signalled in case of the QP for the current block is greater than a pre-defined threshold.

ii. greater than may be replaced by "lower than" or "no greater than" or "no lower than".

h. In one example, the syntax element may be binarized as fixed length code, (truncated) unary code, exponential Golomb code, etc.

i. In one example, the syntax element may be coded with at least one coding context in arithmetic coding.

i. Alternatively, the syntax element may be coded with bypass coding.

General Aspects

5) Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

6) Whether to and/or how to apply the disclosed methods above may be signalled at PB/TB/CB/PU/TU/CU/VPDU/CTU/CTU row/slice/tile/sub-picture/other kinds of region contain more than one sample or pixel.

7) Whether to and/or how to apply the disclosed methods above may be dependent on coded information, such as block size, colour format, single/dual tree partitioning, colour component, slice/picture type.

More details of the embodiments of the present disclosure will be described below which are related to parameter refinement for illumination compensation in video coding. The embodiments of the present disclosure should be considered as examples to explain the general concepts and should not be interpreted in a narrow way. Furthermore, these embodiments can be applied individually or combined in any manner.

As used herein, the term "block" may represent a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a sub-block of a video block, a sub-region within a video block, a video processing unit comprising multiple samples/pixels, and/or the like. A block may be rectangular or non-rectangular.

Figure 30:
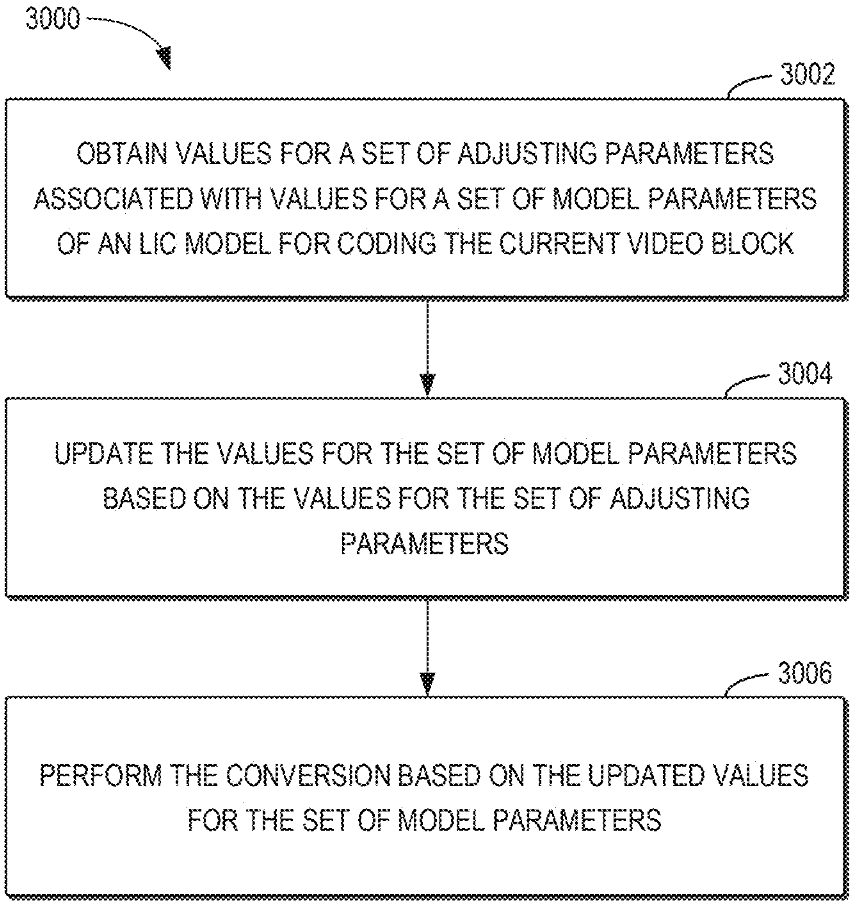
FIG. 30 illustrates a flowchart of a method for video processing in accordance with embodiments of the present disclosure.

FIG. 30 illustrates a flowchart of a method 3000 for video processing in accordance with some embodiments of the present disclosure. The method 3000 may be implemented during a conversion between a current video block of a video and a bitstream of the video. As shown in FIG. 30, the method 3000 starts at 3002 where values for a set of adjusting parameters are obtained. The set of adjusting parameters is associated with values for a set of model parameters of a local illumination compensation (LIC) model for coding the current video block. It should be understood that the set of adjusting parameters may comprise one or more adjusting parameters, and the set of model parameters may comprise one or more adjusting parameters.

By way of example rather than limitation, the values for a set of model parameters may be determined based on a template for the current video block and a template for a reference video block of the current video block. It should be understood that the values for a set of model parameters may also be obtained in any other suitable manner. The scope of the present disclosure is not limited in this respect.

In some embodiments, the set of model parameters may comprise at least one of the following: a scale of the LIC model, or an offset of the LIC model. Correspondingly, the set of adjusting parameters may comprise at least one of the following: a scale adjusting parameter for updating a value for the scale, or an offset adjusting parameter for updating a value for the offset. It should be understood that the set of model parameters may also comprise any other suitable parameter(s). The scope of the present disclosure is not limited in this respect.

In some embodiments, the values for the set of adjusting parameters may be determined at the encoder and the decoder, separately. Alternatively, the values for the set of adjusting parameters may be determined at the encoder and signaled to the decoder. The decoder may obtain the values for the set of adjusting parameters by parsing the bitstream.

At 3004, the values for the set of model parameters are updated based on the values for the set of adjusting parameters. By way of example rather than limitation, a value for the scale may be updated based on a sum of the value for the scale and a value for the scale adjusting para meter. Additionally or alternatively, a value for the offset may be updated based on a sum of the value for the offset and a value for the offset adjusting parameter. It should be understood that the values of the set of model parameters may also be updated in any other suitable manner. The scope of the present disclosure is not limited in this respect.

At 3006, the conversion is performed based on the updated values for the set of model parameters. In some embodiments, the conversion may be performed in aid of the LIC model with the updated values for the set of model parameters. Alternatively, target values for the set of model parameters may be obtained by shifting or clipping at least one of the updated values. Furthermore, the conversion may be performed based on the target values.

In some embodiments, the conversion may include encoding the current video block into the bitstream. Alternatively or additionally, the conversion may include decoding the current video block from the bitstream. It should be understood that the above illustrations and/or examples are described merely for purpose of description. The scope of the present disclosure is not limited in this respect.

In view of the above, the values for at least one model parameter of an LIC model is updated with one or more adjusting parameters. Compared with the conventional solution, the proposed method can refine the model parameter for illumination compensation, so as to obtain model parameter optimal for the current video. Thereby, the coding quality can be improved.

In some embodiments, the current video block may be coded with an advanced motion vector prediction (AMVP) mode, an affine-AMVP mode, a merge mode, a sub-block merge mode, or the like.

In some embodiments, the set of adjusting parameters may comprise a first adjusting parameter. At 3002, a value for the first adjusting parameter may be selected from a plurality of candidate values for the first adjusting parameter based on a size of the current video block, a quantization parameter (QP) value for coding the current video block, and/or the like. By way of example rather than limitation, the number of candidate values in the plurality of candidate values may be dependent on the size of the current video block, the QP value for coding the current video block, and/or the like.

In some embodiments, the values for the set of adjusting parameters may be dependent on a level of the current video block. That is, different values for the set of adjusting parameters are employed at the sequence level, picture level, or slice level.

In some embodiments, the video may further comprise a first video block coded with an LIC mode before the current video block. At 3002, the values for the set of adjusting parameters may be determined based on statistics of the first video block and values for the set of adjusting parameters for coding the first video block. In other words, the values for the set of adjusting parameters are updated dynamically based on the previously observed statistics.

In some embodiments, the video may further comprise a second video block different from the current video block. Information regarding whether to update values for the set of model parameters for coding the second video block may be dependent on a sequence of the second video block, a frame of the second video block, a size of the second video block, a QP value for coding the second video block, and/or the like.

In some embodiments, the video may be associated with a plurality of color planes. Moreover, values for the set of model parameters for coding video blocks associated with at least one of the plurality of color planes may be updated. In some embodiments, values for the set of adjusting parameters may be different for each of the plurality of color planes. In some alternative embodiments, values for the set of adjusting parameters may be the same for all of the plurality of color planes. Alternatively, values for the set of adjusting parameters may be the same for a subset of the plurality of color planes.

In some embodiments, the set of adjusting parameters may comprise a second adjusting parameter. Moreover, a value for the second adjusting parameter or an indication for the value for the second adjusting parameter may be indicated in the bitstream at a picture level, a slice level, a tile level, a coding tree unit (CTU) level, a coding unit (CU) level, a prediction unit (PU) level, a transform unit (TU) level, or the like.

In some embodiments, the value for the second adjusting parameter may be selected from a set of candidate values. The indication may comprise an index of the value for the second adjusting parameter. Alternatively, the value for the second adjusting parameter may be equal to a product of a predefined number and K. K may be a real number and may be comprised in the indication. By way of example rather than limitation, the predefined number may be 1/64 or 1/32.

In some embodiments, the set of candidate values may be dependent on coding information of the current video block. By way of example rather than limitation, the coding information may comprise a slice type, a picture type, a temporal layer, a QP, a block size, a coding mode, a color component, and/or the like.

In some embodiments, the value for the second adjusting parameter or the indication may be coded in a predictive way. By way of example rather than limitation, the value for the second adjusting parameter may be determined based on a value for the second adjusting parameter for coding a neighboring video block of the current video block.

In some embodiments, a syntax element indicating the value for the second adjusting parameter may be binarized as a fixed length code, a unary code, a truncated unary code, an exponential Golomb code, or the like. In some embodiments, a syntax element indicating the value for the second adjusting parameter may be coded with at least one coding context in arithmetic coding. Alternatively, a syntax element indicating the value for the second adjusting parameter may be coded with bypass coding.

In some embodiments, a sign and an absolute value of the second adjusting parameter may be coded separately. In some embodiments, the set of candidate values may be indicated in a slice header, a picture header, a picture parameter set (PPS), a sequence parameter set (SPS), an adaptation parameter sets (APS), or the like.

In some embodiments, if a motion vector (MV) candidate list for the current video block comprise at least one candidate coded with an LIC mode, at least one additional candidate may be added into the MV candidate list. For example, the at least one additional candidate may be generated based on the at least one candidate. It is to be noted that the LIC flag is enabled for the at least one candidate, if the at least one candidate is coded with an LIC mode.

In some embodiments, the current video block may be coded with a merge mode, a merge mode with motion vector difference (MMVD) mode, a combined inter and intra prediction (CIIP) mode, an affine-merge mode, a subblock merge mode, a template matching merge mode, or the like. In some embodiments, the MV candidate may be a merge list, an affine-merge list, a template matching merge list, or the like.

In some embodiments, the at least one additional candidate may comprise a first additional candidate corresponding to a first candidate in the at least one candidate. The first additional candidate may be determined based on information of the first candidate and reference values for the set of model parameters. The reference values may be obtained by adjusting values for the set of model parameters for coding the first candidate with the set of adjusting parameters. In other words, the additional candidate may inherit all the information of the corresponding candidate, and in addition applies the adjusting parameter on the model parameter.

In some embodiments, values for the set of adjusting parameters used for determining the additional candidate may be selected and used in a way similar to the values for the set of adjusting parameters for updating the values for the set of model parameters, as described above.

In some embodiments, the at least one candidate may comprise a plurality of candidates coded with the LIC mode. Moreover, the at least one additional candidate may be generated based on a part of the plurality of candidates.

In some embodiments, the current video block may be coded with a merge mode. Moreover, values for the set of adjusting parameters may be selected based on a type of the merge mode.

In some embodiments, the first additional candidate may be added into the MV candidate list after the first candidate. In one example, the first additional candidate may follow the first candidate in the MV candidate list. Additionally, the first additional candidate may immediately follow the first candidate in the MV candidate list.

In some embodiments, the at least one additional candidate may comprise a plurality of additional candidates determined based on the first additional candidate with different values for the set of adjusting parameters. In other words, more one additional candidate may be generated based on one of the at least one candidate by using different values for the set of adjusting parameters.

In some embodiments, the at least one candidate may comprise a plurality of candidates coded with an LIC mode. One or more additional candidates may be determined for each of the plurality of candidates and added into the MV candidate list.

In some embodiments, if a motion candidate list for a merge mode for coding the current video block comprises a second candidate coded with an LIC mode, a second additional candidate may be determined based on information of the second candidate and reference values for the set of model parameters. The reference values may be obtained by adjusting values for the set of model parameters for coding the second candidate with the set of adjusting parameters. Values for the set of adjusting parameters may be indicated in the bitstream. For example, the values for the set of adjusting parameters may be determined and used based on a type of the merge mode, a size of the current video block, a QP, and/or the like.

In some embodiments, information regarding at least one of the following may be dependent on a dimension of the current video block or a QP for coding the current video block: whether to indicate a first syntax element in the bitstream, or how to indicate the first syntax element in the bitstream. The first syntax element may indicate first information regarding whether the values for the set of adjusting parameters are used for coding the current video block. By way of example rather than limitation, the first information may be dependent on whether the current video block is coded with an AMVP mode or a merge mode. In another example, the first information may be dependent on whether the current video block is uni-predicted or bi-predicted. Alternatively, in a case that the current video block is coded with a merge prediction mode, the first information may be dependent on a type of the merge prediction mode.

In some embodiments, the first syntax element may be indicated in the bitstream. In one example, the first syntax element may be indicated in the bitstream for a Y color plane. Additionally or alternatively, the first syntax element may be indicated in the bitstream for a U color plane. Additionally or alternatively, the first syntax element may be indicated in the bitstream for a V color plane.

In some embodiments, if the current video block is larger than a predefined size, the first syntax element may be indicated in the bitstream. Additionally or alternatively, if a sum of a width and a height of the current video block is larger than a predefined threshold, the first syntax element may be indicated in the bitstream.

In some alternative embodiments, if the current video block is smaller than a predefined size, the first syntax element may be indicated in the bitstream. Additionally or alternatively, if a sum of a width and a height of the current video block is smaller than a predefined threshold, the first syntax element may be indicated in the bitstream.

In some alternative embodiments, if the current video block is larger than or equal to a predefined size, the first syntax element may be indicated in the bitstream. Additionally or alternatively, if a sum of a width and a height of the current video block is larger than or equal to a predefined threshold, the first syntax element may be indicated in the bitstream.

In some alternative embodiments, if the current video block is smaller than or equal to a predefined size, the first syntax element may be indicated in the bitstream. Additionally or alternatively, if a sum of a width and a height of the current video block is smaller than or equal to a predefined threshold, the first syntax element may be indicated in the bitstream.

In some embodiments, if the QP is greater than a predefined threshold, the first syntax element may be indicated in the bitstream. Alternatively, if the QP is smaller than a predefined threshold, the first syntax element may be indicated in the bitstream. In some alternative embodiments, if the QP is larger than or equal to a predefined threshold, the first syntax element may be indicated in the bitstream. In some further embodiments, if the QP is smaller than or equal to a predefined threshold, the first syntax element may be indicated in the bitstream.

In some embodiments, the first syntax element may be binarized as a fixed length code, a unary code, a truncated unary code, an exponential Golomb code, or the like. In some embodiments, the first syntax element may be coded with at least one coding context in arithmetic coding. Alternatively, the first syntax element may be coded with bypass coding.

In some embodiments, whether to and/or how to apply the method may be indicated at a sequence level, a group of pictures level, a picture level, a slice level, a tile group level, or the like. In some embodiments, whether to and/or how to apply the method may be indicated in a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, a tile group header, or the like.

In some embodiments, whether to and/or how to apply the method may be indicated at a region containing more than one sample or pixel. By way of example rather than limitation, the region may comprise a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, and/or a sub-picture.

In some embodiments, whether to and/or how to apply the method may be dependent on the coded information. By way of example rather than limitation, the coded information may comprise a block size, a color format, a single dual tree partitioning, a dual tree partitioning, a color component, a slice type, a picture type, and/or the like.

According to further embodiments of the present disclosure, a non-transitory computer-readable recording medium is provided. The non-transitory computer-readable recording medium stores a bitstream of a video which is generated by a method performed by an apparatus for video processing. In the method, values for a set of adjusting parameters are obtained. The values for a set of adjusting parameters are associated with values for a set of model parameters of an LIC model for coding a current video block of the video. The values for the set of model parameters are updated based on the values for the set of adjusting parameters. Moreover, the bitstream is generated based on the updated values for the set of model parameters.

According to still further embodiments of the present disclosure, a method for storing bitstream of a video is provided. In the method, values for a set of adjusting parameters are obtained. The values for a set of adjusting parameters are associated with values for a set of model parameters of an LIC model for coding a current video block of the video. The values for the set of model parameters are updated based on the values for the set of adjusting parameters. Moreover, the bitstream is generated based on the updated values for the set of model parameters, and stored in a non-transitory computer-readable recording medium.

Implementations of the present disclosure can be described in view of the following clauses, the features of which can be combined in any reasonable manner.

Clause 1. A method for video processing, comprising: obtaining, for a conversion between a current video block of a video and a bitstream of the video, values for a set of adjusting parameters associated with values for a set of model parameters of a local illumination compensation (LIC) model for coding the current video block; updating the values for the set of model parameters based on the values for the set of adjusting parameters; and performing the conversion based on the updated values for the set of model parameters.

Clause 2. The method of clause 1, wherein the set of model parameters comprises at least one of the following: a scale of the LIC model, or an offset of the LIC model.

Clause 3. The method of clause 2, wherein the set of adjusting parameters comprises at least one of the following: a scale adjusting parameter for updating a value for the scale, or an offset adjusting parameter for updating a value for the offset.

Clause 4. The method of clause 3, wherein updating the values for the set of model parameters comprises at least one of: updating a value for the scale based on a sum of the value for the scale and a value for the scale adjusting parameter, or updating a value for the offset based on a sum of the value for the offset and a value for the offset adjusting parameter.

Clause 5. The method of any of clauses 1-4, wherein performing the conversion based on the updated values comprises: obtaining target values for the set of model parameters by shifting or clipping at least one of the updated values; and performing the conversion based on the target values.

Clause 6. The method of any of clauses 1-5, wherein the current video block is coded with one of the following: an advanced motion vector prediction (AMVP) mode, an affine-AMVP mode, a merge mode, or a sub-block merge mode.

Clause 7. The method of any of clauses 1-5, wherein the set of adjusting parameters comprises a first adjusting parameter, and obtaining the values for the set of adjusting parameters comprises: selecting a value for the first adjusting parameter from a plurality of candidate values for the first adjusting parameter based on at least one of the following: a size of the current video block, or a quantization parameter (QP) value for coding the current video block.

Clause 8. The method of clause 7, wherein the number of candidate values in the plurality of candidate values is dependent on at least one of the following: the size of the current video block, or the QP value for coding the current video block.

Clause 9. The method of any of clauses 1-5, wherein the values for the set of adjusting parameters are dependent on a level of the current video block.

Clause 10. The method of any of clauses 1-5, wherein the video further comprises a first video block coded with an LIC mode before the current video block, and obtaining the values for the set of adjusting parameters comprises: determining the values for the set of adjusting parameters based on statistics of the first video block and values for the set of adjusting parameters for coding the first video block.

Clause 11. The method of any of clauses 1-10, wherein the video further comprises a second video block different from the current video block, and information regarding whether to update values for the set of model parameters for coding the second video block is dependent on at least one of the following: a sequence of the second video block, a frame of the second video block, a size of the second video block, or a QP value for coding the second video block.

Clause 12. The method of any of clauses 1-11, wherein the video is associated with a plurality of color planes, and values for the set of model parameters for coding video blocks associated with at least one of the plurality of color planes are updated.

Clause 13. The method of clause 12, wherein values for the set of adjusting parameters are different for each of the plurality of color planes.

Clause 14. The method of clause 12, wherein values for the set of adjusting parameters are the same for all of the plurality of color planes.

Clause 15. The method of clause 12, wherein values for the set of adjusting parameters are the same for a subset of the plurality of color planes.

Clause 16. The method of any of clauses 1-15, wherein the set of adjusting parameters comprises a second adjusting parameter, a value for the second adjusting parameter or an indication for the value for the second adjusting parameter is indicated in the bitstream at one of the following: a picture level, a slice level, a tile level, a coding tree unit (CTU) level, a coding unit (CU) level, a prediction unit (PU) level, or a transform unit (TU) level.

Clause 17. The method of clause 16, wherein the value for the second adjusting parameter is selected from a set of candidate values, and the indication comprises an index of the value for the second adjusting parameter.

Clause 18. The method of clause 16, wherein the value for the second adjusting parameter is equal to a product of a predefined number and K, K is a real number and comprised in the indication.

Clause 19. The method of clause 18, wherein the predefined number is 1/64 or 1/32.

Clause 20. The method of clause 17, wherein the set of candidate values are dependent on coding information of the current video block.

Clause 21. The method of clause 20, wherein the coding information comprises at least one of the following: a slice type, a picture type, a temporal layer, a QP, a block size, a coding mode, or a color component.

Clause 22. The method of clause 16, wherein the value for the second adjusting parameter or the indication is coded in a predictive way.

Clause 23. The method of clause 22, wherein the value for the second adjusting parameter is determined based on a value for the second adjusting parameter for coding a neighboring video block of the current video block.

Clause 24. The method of clause 16, wherein a syntax element indicating the value for the second adjusting parameter is binarized as one of the following: a fixed length code, a unary code, a truncated unary code, or an exponential Golomb code.

Clause 25. The method of clause 16, wherein a syntax element indicating the value for the second adjusting parameter is coded with at least one coding context in arithmetic coding.

Clause 26. The method of clause 16, wherein a syntax element indicating the value for the second adjusting parameter is coded with bypass coding.

Clause 27. The method of clause 16, wherein a sign and an absolute value of the second adjusting parameter is coded separately.

Clause 28. The method of any of clauses 17 or 20-21, wherein the set of candidate values are indicated in one of the following: a slice header, a picture header, a picture parameter set (PPS), a sequence parameter set (SPS), or an adaptation parameter sets (APS).

Clause 29. The method of any of clauses 1-28, wherein if a motion vector (MV) candidate list for the current video block comprises at least one candidate coded with an LIC mode, at least one additional candidate is added into the MV candidate list.

Clause 30. The method of clause 29, wherein the current video block is coded with one of the following: a merge mode, a merge mode with motion vector difference (MMVD) mode, a combined inter and intra prediction (CIIP) mode, an affine-merge mode, a subblock merge mode, or a template matching merge mode.

Clause 31. The method of any of clauses 29-30, wherein the MV candidate is one of the following: a merge list, an affine-merge list, or a template matching merge list.

Clause 32. The method of any of clauses 29-31, wherein the at least one additional candidate comprises a first additional candidate corresponding to a first candidate in the at least one candidate, and the first additional candidate is determined based on information of the first candidate and reference values for the set of model parameters, the reference values being obtained by adjusting values for the set of model parameters for coding the first candidate with the set of adjusting parameters.

Clause 33. The method of clause 32, wherein values for the set of adjusting parameters are selected and used in a way similar to the values for the set of adjusting parameters for updating the values for the set of model parameters.

Clause 34. The method of any of clauses 29-33, wherein the at least one candidate comprises a plurality of candidates coded with the LIC mode, and the at least one additional candidate is generated based on a part of the plurality of candidates.

Clause 35. The method of clause 32, wherein the current video block is coded with a merge mode, and values for the set of adjusting parameters are selected based on a type of the merge mode.

Clause 36. The method of clause 32, wherein the first additional candidate is added into the MV candidate list after the first candidate.

Clause 37. The method of clause 32, wherein the first additional candidate immediately follows the first candidate in the MV candidate list.

Clause 38. The method of any of clause 32-37, wherein the at least one additional candidate comprises a plurality of additional candidates determined based on the first additional candidate with different values for the set of adjusting parameters.

Clause 39. The method of any of clauses 29-38, wherein the at least one candidate comprises a plurality of candidates coded with an LIC mode, and one or more additional candidates are determined for each of the plurality of candidates and added into the MV candidate list.

Clause 40. The method of any of clauses 1-28, wherein if a motion candidate list for a merge mode for coding the current video block comprises a second candidate coded with an LIC mode, a second additional candidate is determined based on information of the second candidate and reference values for the set of model parameters, the reference values being obtained by adjusting values for the set of model parameters for coding the second candidate with the set of adjusting parameters, and values for the set of adjusting parameters are indicated in the bitstream.

Clause 41. The method of clause 40, wherein the values for the set of adjusting parameters are determined and used based on at least one of the following: a type of the merge mode, a size of the current video block, or a QP.

Clause 42. The method of any of clauses 1-41, wherein information regarding at least one of the following is dependent on a dimension of the current video block or a QP for coding the current video block: whether to indicate a first syntax element in the bitstream, the first syntax element indicating first information regarding whether the values for the set of adjusting parameters are used for coding the current video block, or how to indicate the first syntax element in the bitstream.

Clause 43. The method of clause 42, wherein the first syntax element is indicated in the bitstream.

Clause 44. The method of any of clauses 42-43, wherein the first information is dependent on whether the current video block is coded with an AMVP mode or a merge mode.

Clause 45. The method of any of clauses 42-43, wherein the first information is dependent on whether the current video block is uni-predicted or bi-predicted.

Clause 46. The method of any of clauses 42-43, wherein the current video block is coded with a merge prediction mode, and the first information is dependent on a type of the merge prediction mode.

Clause 47. The method of any of clauses 42-46, wherein the first syntax element is indicated in the bitstream for at least one of the following: a Y color plane, a U color plane, or a V color plane.

Clause 48. The method of any of clauses 42-47, wherein if the current video block is larger than a predefined size, the first syntax element is indicated in the bitstream.

Clause 49. The method of any of clauses 42-47, wherein if a sum of a width and a height of the current video block is larger than a predefined threshold, the first syntax element is indicated in the bitstream.

Clause 50. The method of any of clauses 42-47, wherein if the current video block is smaller than a predefined size, the first syntax element is indicated in the bitstream.

Clause 51. The method of any of clauses 42-47, wherein if a sum of a width and a height of the current video block is smaller than a predefined threshold, the first syntax element is indicated in the bitstream.

Clause 52. The method of any of clauses 42-47, wherein if the current video block is larger than or equal to a predefined size, the first syntax element is indicated in the bitstream.

Clause 53. The method of any of clauses 42-47, wherein if a sum of a width and a height of the current video block is larger than or equal to a predefined threshold, the first syntax element is indicated in the bitstream.

Clause 54. The method of any of clauses 42-47, wherein if the current video block is smaller than or equal to a predefined size, the first syntax element is indicated in the bitstream.

Clause 55. The method of any of clauses 42-47, wherein if a sum of a width and a height of the current video block is smaller than or equal to a predefined threshold, the first syntax element is indicated in the bitstream.

Clause 56. The method of any of clauses 42-47, wherein if the QP is greater than a predefined threshold, the first syntax element is indicated in the bitstream.

Clause 57. The method of any of clauses 42-47, wherein if the QP is smaller than a predefined threshold, the first syntax element is indicated in the bitstream.

Clause 58. The method of any of clauses 42-47, wherein if the QP is larger than or equal to a predefined threshold, the first syntax element is indicated in the bitstream.

Clause 59. The method of any of clauses 42-47, wherein if the QP is smaller than or equal to a predefined threshold, the first syntax element is indicated in the bitstream.

Clause 60. The method of any of clauses 42-59, wherein the first syntax element is binarized as one of the following: a fixed length code, a unary code, a truncated unary code, or an exponential Golomb code.

Clause 61. The method of any of clauses 42-59, wherein the first syntax element is coded with at least one coding context in arithmetic coding.

Clause 62. The method of any of clauses 42-59, wherein the first syntax element is coded with bypass coding.

Clause 63. The method of any of clauses 1-62, wherein whether to and/or how to apply the method is indicated at one of the following: a sequence level, a group of pictures level, a picture level, a slice level, or a tile group level.

Clause 64. The method of any of clauses 1-62, wherein whether to and/or how to apply the method is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 65. The method of any of clauses 1-62, wherein whether to and/or how to apply the method is indicated at a region containing more than one sample or pixel.

Clause 66. The method of clause 65, wherein the region comprises at least one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, or a sub-picture.

Clause 67. The method of any of clauses 1-62, wherein whether to and/or how to apply the method is dependent on the coded information.

Clause 68. The method of clause 67, wherein the coded information comprises at least one of the following: a block size, a color format, a single dual tree partitioning, a dual tree partitioning, a color component, a slice type, or a picture type.

Clause 69. The method of any of clauses 1-68, wherein the conversion includes encoding the current video block into the bitstream.

Clause 70. The method of any of clauses 1-68, wherein the conversion includes decoding the current video block from the bitstream.

Clause 71. An apparatus for video processing comprising a processor and a non-transitory memory with instructions thereon, wherein the instructions upon execution by the processor, cause the processor to perform a method in accordance with any of clauses 1-70.

Clause 72. A non-transitory computer-readable storage medium storing instructions that cause a processor to perform a method in accordance with any of clauses 1-70.

Clause 73. A non-transitory computer-readable recording medium storing a bitstream of a video which is generated by a method performed by an apparatus for video processing, wherein the method comprises: obtaining values for a set of adjusting parameters associated with values for a set of model parameters of an LIC model for coding a current video block of the video; updating the values for the set of model parameters based on the values for the set of adjusting parameters; and generating the bitstream based on the updated values for the set of model parameters.

Clause 74. A method for storing a bitstream of a video, comprising: obtaining values for a set of adjusting parameters associated with values for a set of model parameters of an LIC model for coding a current video block of the video; updating the values for the set of model parameters based on the values for the set of adjusting parameters; generating the bitstream based on the updated values for the set of model parameters; and storing the bitstream in a non-transitory computer-readable recording medium.

Example Device

Figure 31:
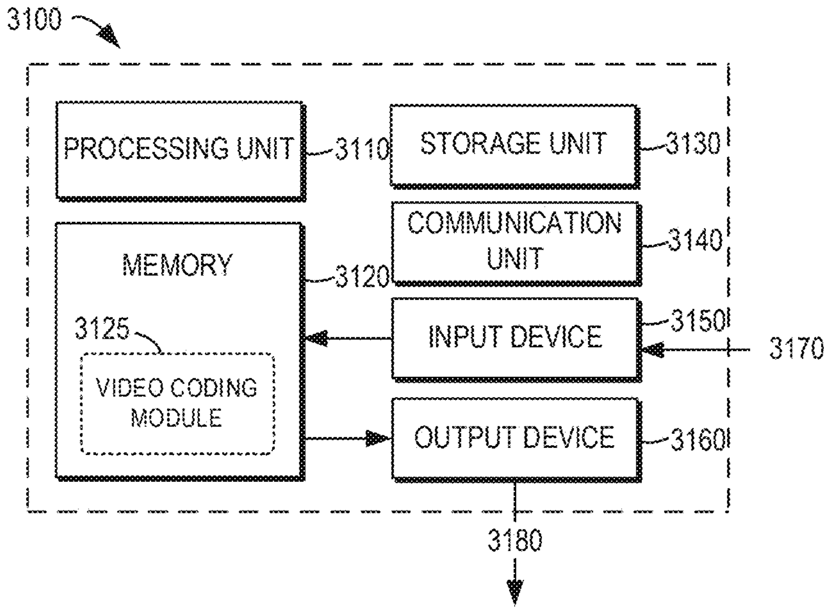
FIG. 31 illustrates a block diagram of a computing device in which various embodiments of the present disclosure can be implemented.

FIG. 31 illustrates a block diagram of a computing device 3100 in which various embodiments of the present disclosure can be implemented. The computing device 3100 may be implemented as or included in the source device 110 (or the video encoder 114 or 200) or the destination device 120 (or the video decoder 124 or 300).

It would be appreciated that the computing device 3100 shown in FIG. 31 is merely for purpose of illustration, without suggesting any limitation to the functions and scopes of the embodiments of the present disclosure in any manner.

As shown in FIG. 31, the computing device 3100 includes a general-purpose computing device 3100. The computing device 3100 may at least comprise one or more processors or processing units 3110, a memory 3120, a storage unit 3130, one or more communication units 3140, one or more input devices 3150, and one or more output devices 3160.

In some embodiments, the computing device 3100 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 3100 can support any type of interface to a user (such as "wearable" circuitry and the like).

The processing unit 3110 may be a physical or virtual processor and can implement various processes based on programs stored in the memory 3120. In a multi-processor system, multiple processing units execute computer executable instructions in parallel so as to improve the parallel processing capability of the computing device 3100. The processing unit 3110 may also be referred to as a central processing unit (CPU), a microprocessor, a controller or a microcontroller.

The computing device 3100 typically includes various computer storage medium. Such medium can be any medium accessible by the computing device 3100, including, but not limited to, volatile and non-volatile medium, or detachable and non-detachable medium. The memory 3120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 3130 may be any detachable or non-detachable medium and may include a machine-readable medium such as a memory, flash memory drive, magnetic disk or another other media, which can be used for storing information and/or data and can be accessed in the computing device 3100.

The computing device 3100 may further include additional detachable/non-detachable, volatile/non-volatile memory medium. Although not shown in FIG. 31, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 3140 communicates with a further computing device via the communication medium. In addition, the functions of the components in the computing device 3100 can be implemented by a single computing cluster or multiple computing machines that can communicate via communication connections. Therefore, the computing device 3100 can operate in a networked environment using a logical connection with one or more other servers, networked personal computers (PCs) or further general network nodes.

The input device 3150 may be one or more of a variety of input devices, such as a mouse, keyboard, tracking ball, voice-input device, and the like. The output device 3160 may be one or more of a variety of output devices, such as a display, loudspeaker, printer, and the like. By means of the communication unit 3140, the computing device 3100 can further communicate with one or more external devices (not shown) such as the storage devices and display device, with one or more devices enabling the user to interact with the computing device 3100, or any devices (such as a network card, a modem and the like) enabling the computing device 3100 to communicate with one or more other computing devices, if required. Such communication can be performed via input/output (I/O) interfaces (not shown).

In some embodiments, instead of being integrated in a single device, some or all components of the computing device 3100 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 3100 may be used to implement video encoding/decoding in embodiments of the present disclosure. The memory 3120 may include one or more video coding modules 3125 having one or more program instructions. These modules are accessible and executable by the processing unit 3110 to perform the functionalities of the various embodiments described herein.

In the example embodiments of performing video encoding, the input device 3150 may receive video data as an input 3170 to be encoded. The video data may be processed, for example, by the video coding module 3125, to generate an encoded bitstream. The encoded bitstream may be provided via the output device 3160 as an output 3180.

In the example embodiments of performing video decoding, the input device 3150 may receive an encoded bitstream as the input 3170. The encoded bitstream may be processed, for example, by the video coding module 3125, to generate decoded video data. The decoded video data may be provided via the output device 3160 as the output 3180.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

obtaining, for a conversion between a current video block of a video and a bitstream of the video, values for a set of adjusting parameters associated with values for a set of model parameters of a local illumination compensation (LIC) model for coding the current video block;

updating the values for the set of model parameters based on the values for the set of adjusting parameters; and performing the conversion based on the updated values for the set of model parameters.

2. The method of claim 1, wherein the set of model parameters comprises at least one of the following:

a scale of the LIC model, or an offset of the LIC model.

3. The method of claim 2, wherein the set of adjusting parameters comprises at least one of the following:

a scale adjusting parameter for updating a value for the scale, or an offset adjusting parameter for updating a value for the offset.

4. The method of claim 3, wherein updating the values for the set of model parameters comprises at least one of:

updating a value for the scale based on a sum of the value for the scale and a value for the scale adjusting parameter, or updating a value for the offset based on a sum of the value for the offset and a value for the offset adjusting parameter.

5. The method of claim 1, wherein performing the conversion based on the updated values comprises: obtaining target values for the set of model parameters by shifting or clipping at least one of the updated values; and performing the conversion based on the target values, or wherein the current video block is coded with one of the following: an advanced motion vector prediction (AMVP) mode, an affine-AMVP mode, a merge mode, or a sub-block merge mode, or wherein the set of adjusting parameters comprises a first adjusting parameter, and obtaining the values for the set of adjusting parameters comprises:

selecting a value for the first adjusting parameter from a plurality of candidate values for the first adjusting parameter based on at least one of the following:

a size of the current video block, or a quantization parameter (QP) value for coding the current video block.

6. The method of claim 5, wherein the number of candidate values in the plurality of candidate values is dependent on at least one of the following:

the size of the current video block, or the QP value for coding the current video block.

7. The method of claim 1, wherein the values for the set of adjusting parameters are dependent on a level of the current video block, or wherein the video further comprises a first video block coded with an LIC mode before the current video block, and obtaining the values for the set of adjusting parameters comprises: determining the values for the set of adjusting parameters based on statistics of the first video block and values for the set of adjusting parameters for coding the first video block, or wherein the video further comprises a second video block different from the current video block, and information regarding whether to update values for the set of model parameters for coding the second video block is dependent on at least one of the following: a sequence of the second video block, a frame of the second video block, a size of the second video block, or a QP value for coding the second video block, or wherein the video is associated with a plurality of color planes, and values for the set of model parameters for coding video blocks associated with at least one of the plurality of color planes are updated, or wherein the set of adjusting parameters comprises a second adjusting parameter, a value for the second adjusting parameter or an indication for the value for the second adjusting parameter is indicated in the bitstream at one of the following:

a picture level, a slice level, a tile level, a coding tree unit (CTU) level, a coding unit (CU) level, a prediction unit (PU) level, or a transform unit (TU) level.

8. The method of claim 1, wherein if a motion vector (MV) candidate list for the current video block comprises at least one candidate coded with an LIC mode, at least one additional candidate is added into the MV candidate list.

9. The method of claim 8, wherein the current video block is coded with one of the following: a merge mode, a merge mode with motion vector difference (MMVD) mode, a combined inter and intra prediction (CIIP) mode, an affine-merge mode, a subblock merge mode, or a template matching merge mode, or wherein the MV candidate is one of the following: a merge list, an affine-merge list, or a template matching merge list, or wherein the at least one additional candidate comprises a first additional candidate corresponding to a first candidate in the at least one candidate, and the first additional candidate is determined based on information of the first candidate and reference values for the set of model parameters, the reference values being obtained by adjusting values for the set of model parameters for coding the first candidate with the set of adjusting parameters.

10. The method of claim 9, wherein values for the set of adjusting parameters are selected and used in a way similar to the values for the set of adjusting parameters for updating the values for the set of model parameters, or wherein the at least one candidate comprises a plurality of candidates coded with the LIC mode, and the at least one additional candidate is generated based on a part of the plurality of candidates, or wherein the current video block is coded with a merge mode, and values for the set of adjusting parameters are selected based on a type of the merge mode, or wherein the first additional candidate is added into the MV candidate list after the first candidate, or wherein the first additional candidate immediately follows the first candidate in the MV candidate list, or wherein the at least one additional candidate comprises a plurality of additional candidates determined based on the first additional candidate with different values for the set of adjusting parameters, or wherein the at least one candidate comprises a plurality of candidates coded with an LIC mode, and one or more additional candidates are determined for each of the plurality of candidates and added into the MV candidate list.

11. The method of claim 1, wherein if a motion candidate list for a merge mode for coding the current video block comprises a second candidate coded with an LIC mode, a second additional candidate is determined based on information of the second candidate and reference values for the set of model parameters, the reference values being obtained by adjusting values for the set of model parameters for coding the second candidate with the set of adjusting parameters, and values for the set of adjusting parameters are indicated in the bitstream.

12. The method of claim 11, wherein the values for the set of adjusting parameters are determined and used based on at least one of the following:

a type of the merge mode, a size of the current video block, or a QP.

13. The method of claim 1, wherein information regarding at least one of the following is dependent on a dimension of the current video block or a QP for coding the current video block:

whether to indicate a first syntax element in the bitstream, the first syntax element indicating first information regarding whether the values for the set of adjusting parameters are used for coding the current video block, or how to indicate the first syntax element in the bitstream.

14. The method of claim 13, wherein the first syntax element is indicated in the bitstream, or wherein the first information is dependent on whether the current video block is coded with an AMVP mode or a merge mode, or wherein the first information is dependent on whether the current video block is uni-predicted or bi-predicted, or wherein the current video block is coded with a merge prediction mode, and the first information is dependent on a type of the merge prediction mode, or wherein the first syntax element is indicated in the bitstream for at least one of the following:

a Y color plane, a U color plane, or a V color plane.

15. The method of claim 13, wherein if the current video block is larger than a predefined size, the first syntax element is indicated in the bitstream, or wherein if a sum of a width and a height of the current video block is larger than a predefined threshold, the first syntax element is indicated in the bitstream, or wherein if the current video block is smaller than a predefined size, the first syntax element is indicated in the bitstream, or wherein if a sum of a width and a height of the current video block is smaller than a predefined threshold, the first syntax element is indicated in the bitstream, or wherein if the current video block is larger than or equal to a predefined size, the first syntax element is indicated in the bitstream, or wherein if a sum of a width and a height of the current video block is larger than or equal to a predefined threshold, the first syntax element is indicated in the bitstream, or wherein if the current video block is smaller than or equal to a predefined size, the first syntax element is indicated in the bitstream, or wherein if a sum of a width and a height of the current video block is smaller than or equal to a predefined threshold, the first syntax element is indicated in the bitstream, or wherein if the QP is greater than a predefined threshold, the first syntax element is indicated in the bitstream, or wherein if the QP is smaller than a predefined threshold, the first syntax element is indicated in the bitstream, or wherein if the QP is larger than or equal to a predefined threshold, the first syntax element is indicated in the bitstream, or wherein if the QP is smaller than or equal to a predefined threshold, the first syntax element is indicated in the bitstream.

16. The method of claim 1, wherein the conversion includes encoding the current video block into the bitstream.

17. The method of claim 1, wherein the conversion includes decoding the current video block from the bitstream.

18. An apparatus for video processing comprising a processor and a non-transitory memory with instructions thereon, wherein the instructions upon execution by the processor, cause the processor to perform acts comprising:

obtaining, for a conversion between a current video block of a video and a bitstream of the video, values for a set of adjusting parameters associated with values for a set of model parameters of a local illumination compensation (LIC) model for coding the current video block;

updating the values for the set of model parameters based on the values for the set of adjusting parameters; and performing the conversion based on the updated values for the set of model parameters.

19. A non-transitory computer-readable storage medium storing instructions that cause a processor to perform acts comprising:

obtaining, for a conversion between a current video block of a video and a bitstream of the video, values for a set of adjusting parameters associated with values for a set of model parameters of a local illumination compensation (LIC) model for coding the current video block;

updating the values for the set of model parameters based on the values for the set of adjusting parameters; and performing the conversion based on the updated values for the set of model parameters.

20. A non-transitory computer-readable recording medium storing a bitstream of a video which is generated by a method performed by an apparatus for video processing, wherein the method comprises:

obtaining values for a set of adjusting parameters associated with values for a set of model parameters of an LIC model for coding a current video block of the video;

updating the values for the set of model parameters based on the values for the set of adjusting parameters; and generating the bitstream based on the updated values for the set of model parameters.

* * * * *